US009183807B2

(12) United States Patent
Small et al.

(10) Patent No.: US 9,183,807 B2
(45) Date of Patent: Nov. 10, 2015

(54) DISPLAYING VIRTUAL DATA AS PRINTED CONTENT

(75) Inventors: Sheridan Martin Small, Seattle, WA (US); Alex Aben-Athar Kipman, Redmond, WA (US); Benjamin I. Vaught, Seattle, WA (US); Kathryn Stone Perez, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 13/347,576

(22) Filed: Jan. 10, 2012

(65) Prior Publication Data

US 2013/0147687 A1 Jun. 13, 2013

Related U.S. Application Data

(63) Continuation-in-part of application No. 13/313,368, filed on Dec. 7, 2011, and a continuation-in-part of application No. 13/346,674, filed on Jan. 9, 2012.

(51) Int. Cl.
*G09G 5/00* (2006.01)
*G06F 3/01* (2006.01)
(Continued)

(52) U.S. Cl.
CPC .............. *G09G 5/00* (2013.01); *G02B 27/017* (2013.01); *G06F 3/011* (2013.01); *G06T 19/006* (2013.01);
(Continued)

(58) Field of Classification Search
CPC ....... G06T 19/006; G06T 19/00; G06F 3/011; G06F 3/012; G06F 3/0304
USPC .................................................. 345/632–633
See application file for complete search history.

(56) References Cited

U.S. PATENT DOCUMENTS 5,954,515 A 9/1999 Iggulden
6,175,343 B1 1/2001 Mitchell et al.
(Continued)

FOREIGN PATENT DOCUMENTS

CN 1568453 1/2005
CN 102142005 8/2011
(Continued)

OTHER PUBLICATIONS

Asai, et al., "Augmented Instructions—A Fusion of Augmented Reality and Printed Learning Materials", Proceedings of the Fifth IEEE International Conference on Advanced Learning Technologies, IEEE Computer Society, Jul. 5-8, 2005, pp. 213-215. 3 pages.
(Continued)

*Primary Examiner* — Todd Buttram
(74) *Attorney, Agent, or Firm* — Dan Choi; Judy Yee; Micky Minhas

(57) ABSTRACT

The technology provides embodiments for displaying virtual data as printed content by a see-through, near-eye, mixed reality display device system. One or more literary content items registered to a reading object in a field of view of the display device system are displayed with print layout characteristics. Print layout characteristics from a publisher of each literary content item are selected if available. The reading object has a type like a magazine, book, journal or newspaper and may be a real object or a virtual object displayed by the display device system. The reading object type of the virtual object is based on a reading object type associated with a literary content item to be displayed. Virtual augmentation data registered to a literary content item is displayed responsive to detecting user physical action in image data. An example of a physical action is a page flipping gesture.

20 Claims, 22 Drawing Sheets

(51) Int. Cl.
*G06T 19/00* (2011.01)
*G02B 27/01* (2006.01)

(52) U.S. Cl.
CPC ... *G02B 2027/014* (2013.01); *G02B 2027/0138* (2013.01); *G02B 2027/0178* (2013.01); *G02B 2027/0187* (2013.01); *G09G 2354/00* (2013.01); *G09G 2380/14* (2013.01)

(56) References Cited

U.S. PATENT DOCUMENTS

| | | |
|---|---|---|
| 6,266,057 B1 | 7/2001 | Kuzunuki et al. |
| 6,408,257 B1 | 6/2002 | Harrington et al. |
| 6,427,140 B1* | 7/2002 | Ginter et al. ............... 705/80 |
| 6,457,024 B1 | 9/2002 | Felsentein et al. |
| 6,466,975 B1* | 10/2002 | Sterling ................. 709/223 |
| 6,788,293 B1 | 9/2004 | Silverbrook et al. |
| 6,947,219 B1 | 9/2005 | Ou |
| 7,289,130 B1* | 10/2007 | Satoh et al. ................ 345/629 |
| 7,372,451 B2* | 5/2008 | Dempski .................. 345/158 |
| 7,509,570 B2* | 3/2009 | Narusawa ................. 715/211 |
| 7,774,075 B2 | 8/2010 | Lin |
| 7,837,094 B2 | 11/2010 | Rhoads |
| 7,848,573 B2 | 12/2010 | Wecker et al. |
| 7,969,383 B2 | 6/2011 | Eberl et al. |
| 2003/0043144 A1 | 3/2003 | Pundarika et al. |
| 2003/0059762 A1 | 3/2003 | Fujiwara et al. |
| 2004/0008368 A1* | 1/2004 | Plunkett et al. ............ 358/1.15 |
| 2004/0104935 A1 | 6/2004 | Williamson et al. |
| 2005/0143172 A1 | 6/2005 | Kurzweil |
| 2006/0028400 A1* | 2/2006 | Lapstun et al. .................. 345/8 |
| 2006/0122905 A1* | 6/2006 | Marshall et al. ................ 705/26 |
| 2006/0141436 A1* | 6/2006 | Rines ............................ 434/318 |
| 2006/0150848 A1* | 7/2006 | Deutsch ........................ 101/483 |
| 2006/0244677 A1 | 11/2006 | Dempski |
| 2007/0005795 A1 | 1/2007 | Gonzalez |
| 2007/0093169 A1 | 4/2007 | Blaszczyk et al. |
| 2007/0104036 A1 | 5/2007 | Prax et al. |
| 2007/0157080 A1 | 7/2007 | Wadsworth et al. |
| 2007/0226321 A1 | 9/2007 | Bengtson |
| 2007/0285338 A1 | 12/2007 | Yanagisawa |
| 2008/0266323 A1 | 10/2008 | Biocca et al. |
| 2009/0243967 A1 | 10/2009 | Kato |
| 2009/0243968 A1 | 10/2009 | Nakazawa |
| 2010/0048242 A1 | 2/2010 | Rhoads et al. |
| 2010/0111405 A1 | 5/2010 | Lee et al. |
| 2010/0149073 A1 | 6/2010 | Chaum et al. |
| 2010/0199232 A1 | 8/2010 | Mistry et al. |
| 2010/0208302 A1* | 8/2010 | Lee .............................. 358/1.15 |
| 2011/0018903 A1 | 1/2011 | Lapstun et al. |
| 2011/0029443 A1 | 2/2011 | King et al. |
| 2011/0081867 A1 | 4/2011 | Issa et al. |
| 2011/0096401 A1 | 4/2011 | Levola |
| 2011/0141511 A1* | 6/2011 | Milanski et al. ............ 358/1.15 |
| 2011/0148924 A1* | 6/2011 | Tapley et al. ................. 345/634 |
| 2011/0167350 A1 | 7/2011 | Hoellwarth |
| 2011/0181497 A1 | 7/2011 | Raviv |
| 2011/0187744 A1 | 8/2011 | Kim et al. |
| 2011/0195388 A1 | 8/2011 | Henshall et al. |
| 2011/0205148 A1 | 8/2011 | Corriveau et al. |
| 2011/0213664 A1 | 9/2011 | Osterhout et al. |
| 2011/0216091 A1* | 9/2011 | Song et al. .................... 345/634 |
| 2011/0261030 A1 | 10/2011 | Bullock |
| 2011/0279479 A1 | 11/2011 | Rodriguez |
| 2011/0288964 A1 | 11/2011 | Linder et al. |
| 2011/0316806 A1 | 12/2011 | Lapstun et al. |
| 2012/0001923 A1 | 1/2012 | Weinzimmer et al. |
| 2012/0064204 A1* | 3/2012 | Davila et al. .................. 426/231 |
| 2012/0088543 A1 | 4/2012 | Lindner et al. |
| 2012/0154557 A1 | 6/2012 | Perez et al. |
| 2012/0188148 A1 | 7/2012 | DeJong |
| 2012/0188279 A1 | 7/2012 | Demaine |
| 2012/0249831 A1 | 10/2012 | Porter |
| 2012/0320092 A1* | 12/2012 | Shin et al. ..................... 345/633 |
| 2012/0324493 A1 | 12/2012 | Holmdahl et al. |
| 2013/0016102 A1 | 1/2013 | Look et al. |
| 2013/0044128 A1 | 2/2013 | Liu et al. |
| 2013/0044129 A1 | 2/2013 | Latta et al. |
| 2013/0044130 A1 | 2/2013 | Geisner et al. |
| 2013/0046616 A1* | 2/2013 | Williams et al. ............ 705/14.45 |
| 2013/0050432 A1 | 2/2013 | Perez et al. |
| 2013/0054576 A1 | 2/2013 | Karmarkar et al. |
| 2013/0057891 A1* | 3/2013 | Aoki ............................ 358/1.13 |
| 2013/0076788 A1 | 3/2013 | Zvi |
| 2013/0083003 A1 | 4/2013 | Perez et al. |
| 2013/0083333 A1* | 4/2013 | Lopez et al. .................... 358/1.2 |
| 2013/0169682 A1 | 7/2013 | Novak et al. |
| 2013/0235347 A1 | 9/2013 | Hennessey et al. |
| 2013/0298030 A1 | 11/2013 | Nahumi et al. |

FOREIGN PATENT DOCUMENTS

| | | | | |
|---|---|---|---|---|
| EP | 1060772 | 12/2000 | | |
| JP | 07177442 | 7/1995 | | |
| JP | 2001154637 | 6/2001 | | |
| JP | 2004133784 A | * 4/2004 | ............. | G06F 17/21 |
| JP | 2007200261 | 8/2007 | | |
| JP | 2007214964 | 8/2007 | | |
| KR | 20000032647 | 6/2000 | | |
| KR | 20090036183 | 4/2009 | | |
| KR | 20090060421 | 6/2009 | | |
| WO | 0167214 | 9/2001 | | |

OTHER PUBLICATIONS

Biggs, John, "CMU Researchers Turn Any Surface Into a Touchscreen," TechCrunch [online], Oct. 17, 2011 [retrieved on Oct. 21, 2011], Retrieved from the Internet: <URL:http://techcrunch.com/2011/10/17/cmu-researchers-turn-any-surface-into-a-touchscreen/>, 6 pages.

Billinghurst et al., "MagicBook: Transitioning between Reality and Virtuality," Proceedings of the 2001 Conference on Human Factors in Computing Systems (CHI '01), Mar. 31-Apr. 5, 2001, Seattle, WA, USA. 2 pages.

Card, et al., "3Book: A Scalable 3D Virtual Book," Proceedings of the 2004 Conference on Human Factors in Computing Systems (CHI '04), Apr. 24-29, 2004, in Vienna, Austria, ACM, 4 pages.

Dachselt, et al., "Interacting with Printed Books Using Digital Pens and Smart Mobile Projection," Proceedings of the Workshop on Mobile and Personal Projection (MP$^2$) (CHI '11), ACM, Vancouver, Canada, May 7-12, 2011, 5 pages.

Grasset, et al., "Edutainment with a Mixed Reality Book: A Visually Augmented Illustrative Childrens' Book," Proceedings of the International Conference on Advances in Computer Entertainment Technology, 2008, pp. 292-295, 4 pages.

Grasset, et al., "The Design of a Mixed-Reality Book: Is It Still a Real Book?,": Proceedings of the 7th IEEE/ACM International Symposium on Mixed and Augmented Reality, Sep. 15-18, 2008, pp. 99-102, 4 pages.

Hanheide, Marc, "A Cognitive Ego-Vision System for Interactive Assistance", Bielefeld University, Oct. 2006, 198 pages.

Hong, et al., "Annotating 3D Electronic Books," Proceedings of the Conference on Human Factors in Computing Systems (CHI '05), Apr. 2-7, 2005, in Portland, Oregon, ACM, 4 pages.

Weibel et al., "PaperProof: A Paper-Digital Proof-Editing System," Proceedings of the 2008 Conference on Human Factors in Computing Systems (CHI '08), Apr. 5-10, 2008, Florence, Italy, 13 pages.

Wu, et al., "Turning a Page on the Digital Annotation of Physical Books," Proceedings of the 2nd International Conference on Tangible and Embedded Interaction, Feb. 18-20, 2008, Bonn, Germany, ACM, 8 pages.

U.S. Appl. No. 13/313,368, filed Dec. 7, 2011.
U.S. Appl. No. 13/346,674, filed Jan. 9, 2012.

Liarokapis, Fotis, "An Augmented Reality Interface for Visualizing and Interacting with Virtual Content", Draft Paper to Appear in Journal of Virtual Reality, vol. 11, Issue 1, Feb. 2007, 18 pages.

Veltman, Kim H., "Augmented Books, Knowledge, and Culture", in Proceedings of INET'2000, Jul. 2000, 93 pages.

U.S. Appl. No. 13/485,627, filed May 31, 2012.

(56) References Cited

OTHER PUBLICATIONS

International Search Report and Written Opinion dated Mar. 18, 2013 in International Patent Application No. PCT/US2012/067647, 8 pages.
English abstract for JP2007200261 published Aug. 9, 2007.
International Search Report and Written Opinion dated Mar. 22, 2013 in International Patent Application No. PCT/US2012/067805, 7 pages.
English abstract for KR20000032647 published Jun. 15, 2000.
English abstract for KR20090036183 published Apr. 14, 2009.
International Search Report and Written Opinion dated Mar. 22, 2013 in International Patent Application No. PCT/US2012/067806, 7 pages.
English abstract for JP07177442 published Jul. 14, 1995.
English abstract for JP2001154637 published Jun. 8, 2001.
English abstract for JP2007214964 published Aug. 23, 2007.
English abstract for KR20090060421 published Jun. 12, 2009.
Office Action dated Nov. 5, 2013 in U.S. Appl. No. 13/313,368, 57 pages.
Office Action dated Nov. 7, 2013 in U.S. Appl. No. 13/346,674, 43 pages.
Response to Office Action filed Mar. 7, 2014 in U.S. Appl. No. 13/346,674, 14 pages.
Response to Office Action filed May 5, 2014 in U.S. Appl. No. 13/313,368, 17 pages.
Office Action dated Apr. 14, 2014 in U.S. Appl. No. 13/485,627, 110 pages.
Office Action dated Jun. 2, 2014 in U.S. Appl. No. 13/346,674, 32 pages.
Response to Office Action filed Oct. 14, 2014 in U.S. Appl. No. 13/313,368, 9 pages.
Response to Office Action filed Aug. 13, 2014 in U.S. Appl. No. 13/485,627, 14 pages.
Office Action filed Jul. 14, 2014 in U.S. Appl. No. 13/313,368, 35 pages.
Office Action dated Oct. 24, 2014 in U.S. Appl. No. 13/485,627, 52 pages.
Notice of Allowance dated Nov. 7, 2014 in U.S. Appl. No. 13/313,368, 13 pages.
Response to Final Office Action filed Dec. 1, 2014 in U.S. Appl. No. 13/346,674, 14 pages.
Office Action dated Jan. 5, 2015 in U.S. Appl. No. 13/346,674.
Response to Final Office Action filed Jan. 23, 2015 in U.S. Appl. No. 13/485,627.
Notice of Allowance and Fee(s) Due dated Feb. 3, 2015 in U.S. Appl. No. 13/485,627.
Notice of Allowance and Fee(s) Due dated Feb. 4, 2015 in U.S. Appl. No. 13/313,368.
Notice of Allowance and Fee(s) Due dated Feb. 27, 2015 in U.S. Appl. No. 13/485,627.
"First Office Action and Search Report Issued in Chinese Patent Application No. 201210526353.6", with partial English translation, Mailed Date: Apr. 3, 2015, 17 Pages.
"First Office Action and Search Report Issued in Chinese Patent Application No. 201210525621.2", with partial English translation, Mailed Date: Apr. 3, 2015, 18 Pages.
Response Office Action filed Apr. 6, 2015 in U.S. Appl. No. 13/346,674.
First Office Action and Search Report, with partial English translation, dated May 5, 2015 in Chinese Patent Application No. 201210520999.3.
Final Office Action dated May 27, 2015 in U.S. Appl. No. 13/346,674.

* cited by examiner

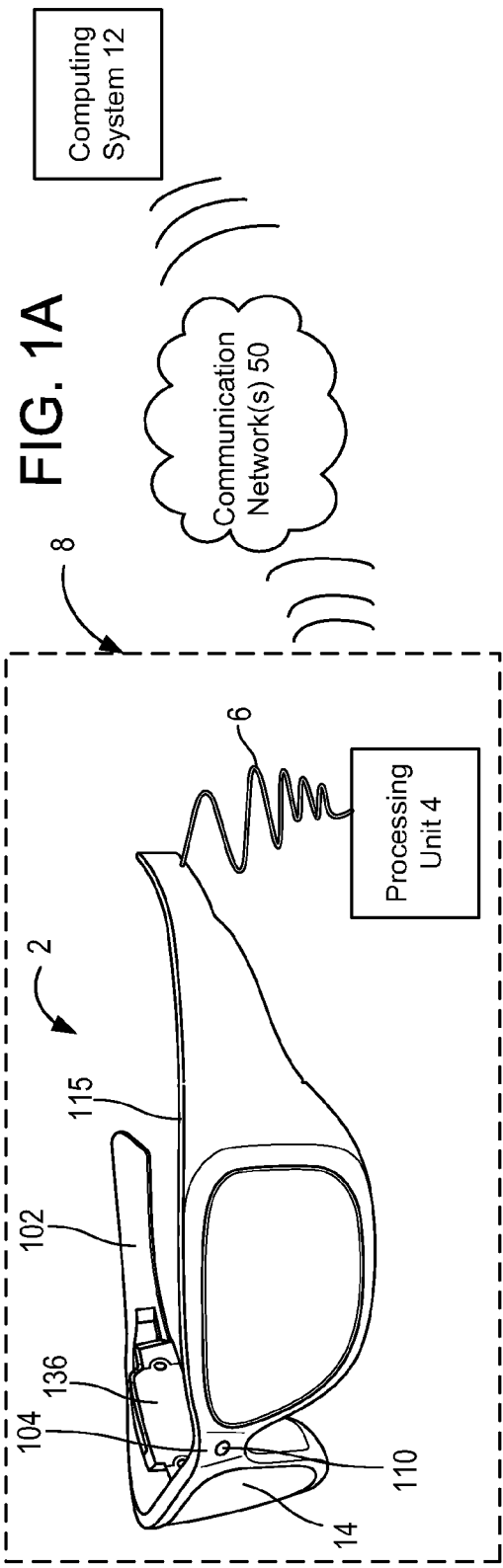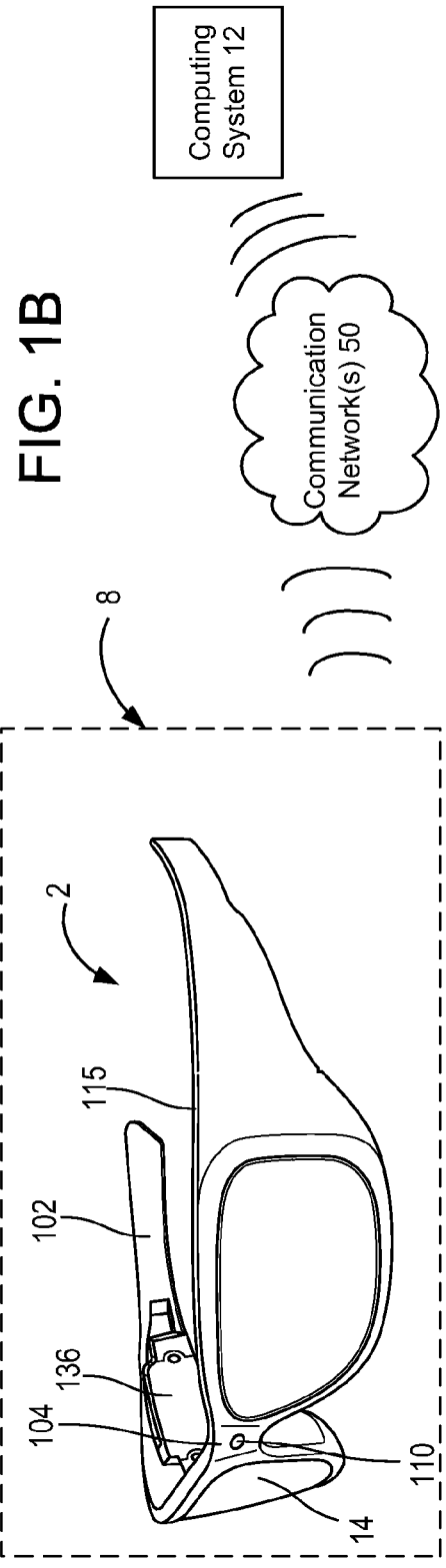

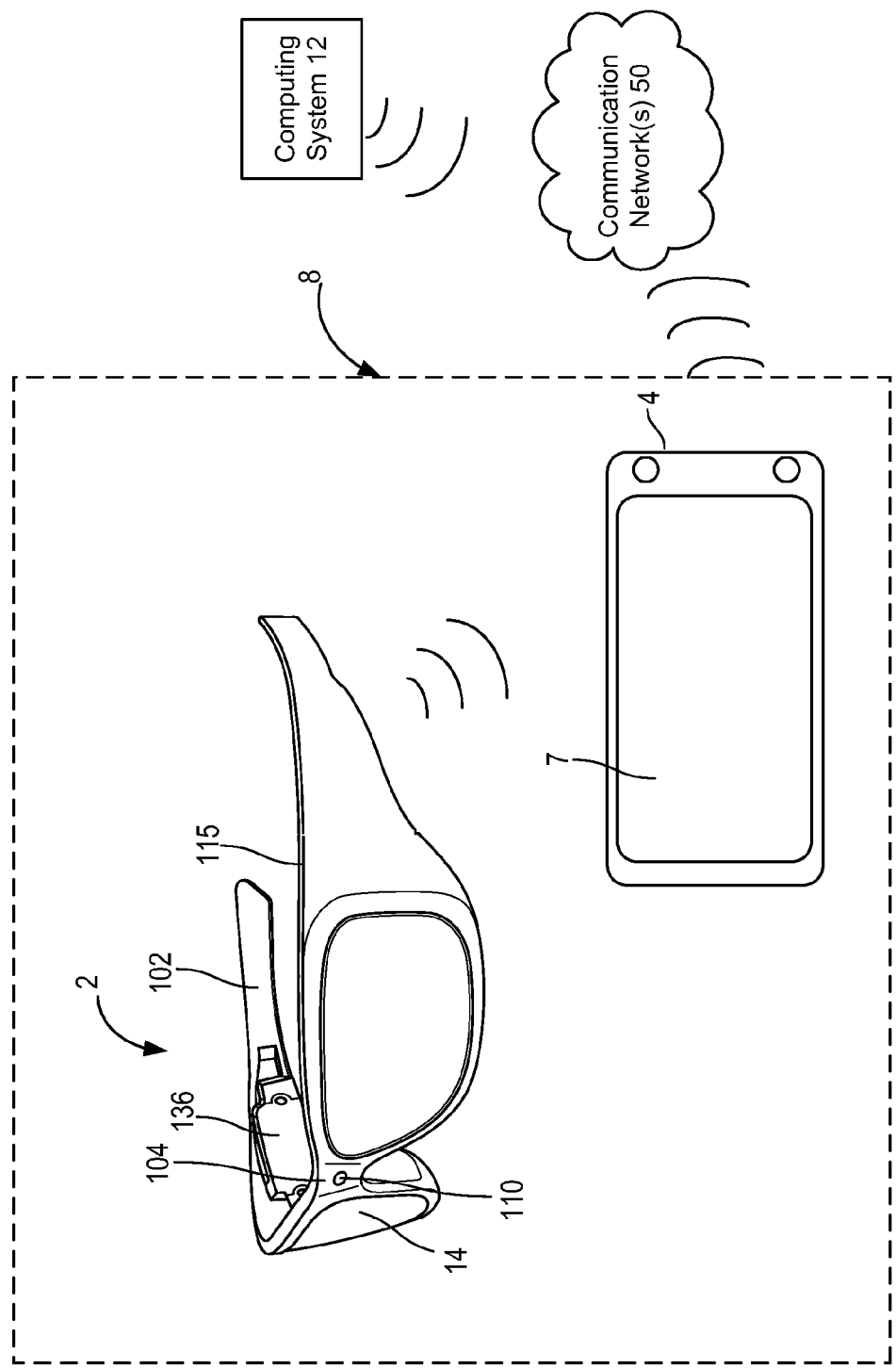

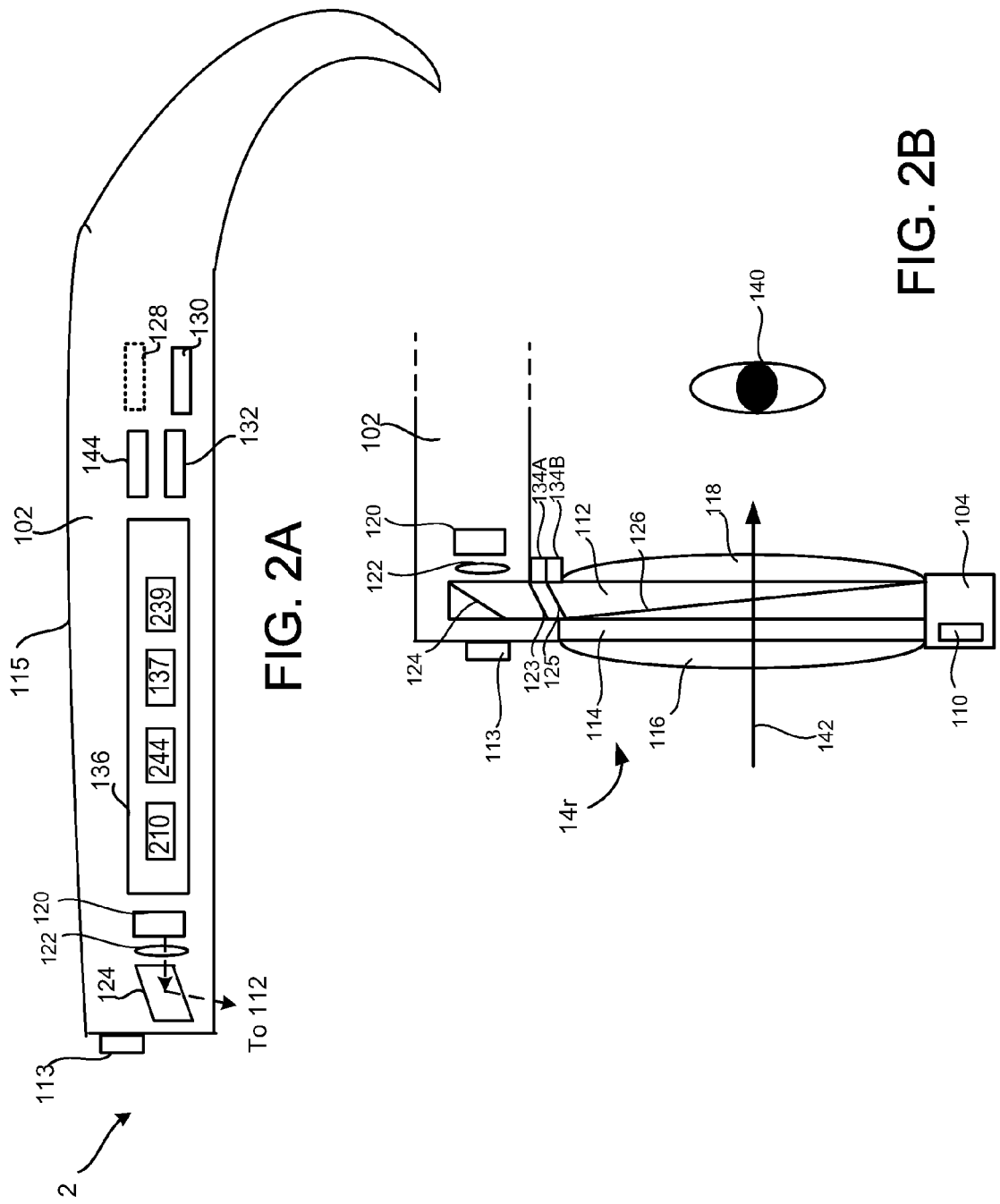

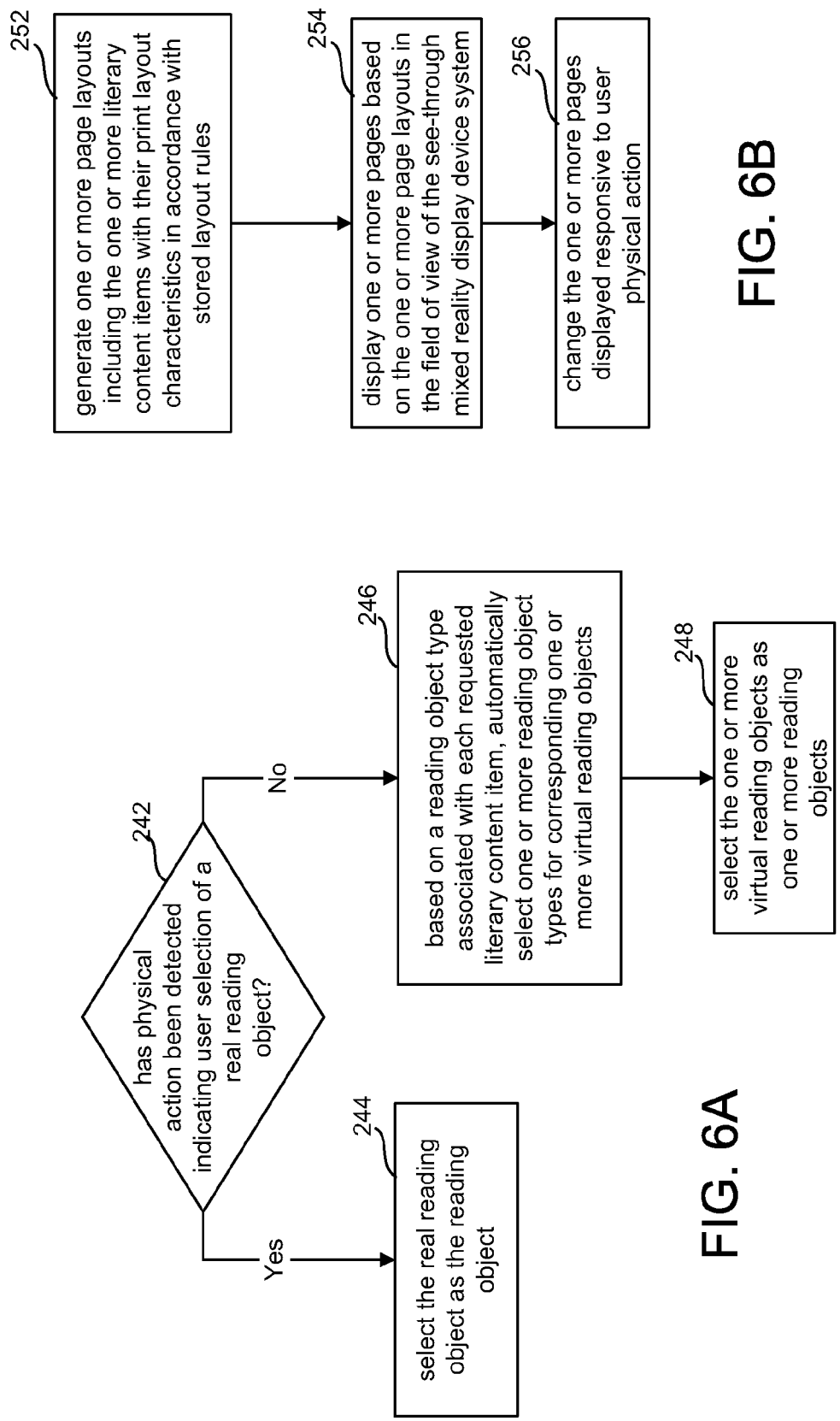

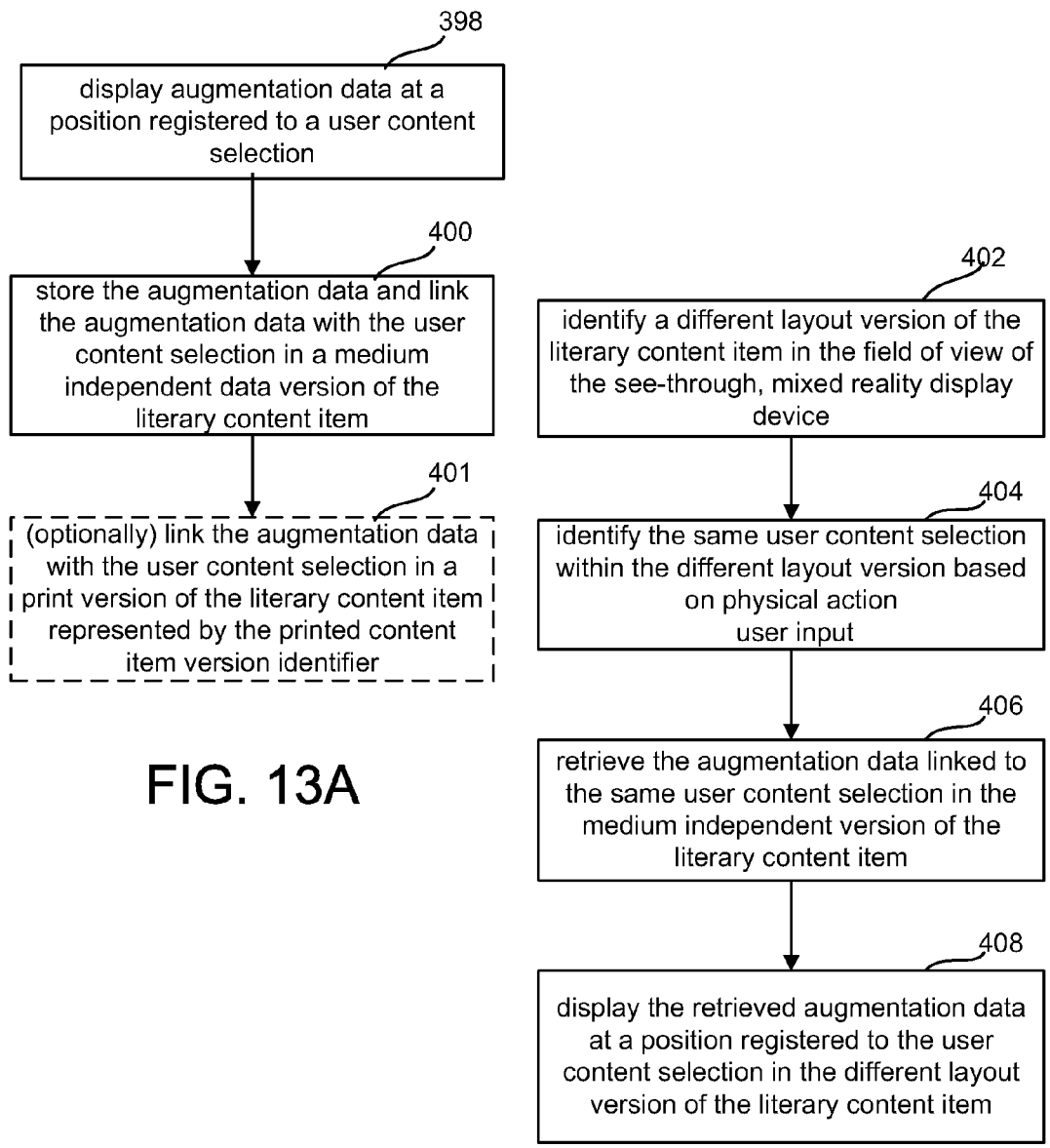

DISPLAYING VIRTUAL DATA AS PRINTED CONTENT

CROSS REFERENCE TO RELATED PATENT APPLICATIONS

This application claims priority as a continuation-in-part to U.S. patent application Ser. No. 13/313,368 entitled "Making Static Printed Content Dynamic with Virtual Data," having the same inventors and filed Dec. 7, 2011, which is hereby incorporated by reference.

This application claims priority as a continuation-in-part to U.S. patent application Ser. No. 13/346,674 entitled "Updating Printed Content with Personalized Virtual Data," having the same inventors and filed Jan. 9, 2012, which is hereby incorporated by reference.

BACKGROUND

Static printed material may be thought of as a form of read only memory which requires no power and stores its data in a form visible to the human eye. Vellum texts over a thousand years old survive to this day. The physical nature of the printed material allows a user to physically sift through its data for "something of interest," for example, by flipping through its pages and looking at photos or catchy titles in a magazine. Of course, physical books, periodicals and paper have their disadvantages too due to the permanent setting of information on their pages.

SUMMARY

Mixed reality is a technology that allows virtual imagery to be mixed with a real world view. A see-through, near-eye, mixed reality display device may be worn by a user to view the mixed imagery of real objects and virtual objects displayed in the user's field of view. A near-eye, mixed reality display device system such as a head mounted display (HMD) device, displays literary content on a reading object. Literary content refers to a literary work for reading. The literary work may include image data which accompanies its text. The literary content may be published or unpublished like one's class notes or a memorandum.

The reading object may be a real object of material upon which literary content is printed or handwritten like one or more pages of paper, bound or unbound. The pages may be blank or have something printed on them like lines or text. One or more literary content items may be displayed with an opaque background over written or imprinted pages. Another characteristic of a real reading object is that it is capable of being held in human hands and manipulated by hands and or fingers. The reading object may also be a virtual object. The literary content requested to be displayed is displayed with the appearance of printed content. Some examples of a type of reading object, whether real or virtual, are a page of paper, unbound pages of paper, a book, a newspaper, a magazine, and a journal.

The technology provides an embodiment of a method for displaying virtual data as printed content using a see-through, near eye, mixed reality display device. The method comprises receiving a request to display one or more literary content items registered to a reading object in a field of view of the see-through, near-eye, mixed reality display device system and selecting print layout characteristics for each of the one or more literary content items which are displayed with their respective print layout characteristics registered to the reading object in the field of view.

The technology provides an embodiment of a system for a see-through, near-eye, mixed reality display device system for displaying virtual data as printed content. The system comprises a see-through display positioned by a support structure. An example of a support structure is a frame. At least one outward facing camera is positioned on the support structure for capturing image data of a field of view of the see-through display. One or more software controlled processors are communicatively coupled to the at least one outward facing camera for receiving the image data of the field of view and also have access to one or more datastores including content, print layout characteristics and virtual augmentation data for literary content items. The one or more software controlled processors select print layout characteristics for each of the one or more literary content items from the one or more data stores. At least one image generation unit is optically coupled to the see-through display and is communicatively coupled to the one or more software controlled processors which cause the image generation unit to display the one or more literary content items with their respective selected print layout characteristics registered to a reading object in the field of view.

The literary content as well as augmentation virtual data discussed below is image data generated by the display device for the user to see when wearing the near-eye display. This image data is also referred to as virtual data as it is displayed unlike real text printed in ink on a page. The virtual data may be two-dimensional (2D) or three-dimensional (3D). A virtual object or virtual data which is registered to another object means the virtual object tracks its position in a field of view of the see-through display device in reference to or dependent upon a position of the other object, which may be real or virtual.

The technology provides an embodiment of one or more processor readable storage devices having instructions encoded thereon which instructions cause one or more processors to execute a method for displaying virtual data as printed content using a see-through, near eye, mixed reality display device system. The method comprises receiving a request to display one or more literary content items registered to a reading object in a field of view of the see-through, near-eye, mixed reality display device system and selecting print layout characteristics for each of the one or more literary content items which are displayed with their respective print layout characteristics registered to the reading object in the field of view. The method further comprises displaying virtual augmentation data registered to at least one of the one or more literary content items responsive to physical action user input.

A physical action user input is an action performed by a user using a body part and captured in image data. The physical action signifies data or commands which direct the operation of an application. Some examples of a physical action are a gesture, eye gaze, and a sound or speech generated by a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of a see-through, mixed reality display device system.

FIG. 1B is a block diagram depicting example components of another embodiment of a see-through, mixed reality display device system.

FIG. 1C is a block diagram depicting example components of another embodiment of a see-through, mixed reality display device system using a mobile device as a processing unit.

FIG. 2A is a side view of an eyeglass temple of a frame in an embodiment of the see-through, mixed reality display device embodied as eyeglasses providing support for hardware and software components.

FIG. 2B is a top view of an embodiment of a display optical system of a see-through, near-eye, mixed reality device.

FIG. 6A is a flowchart of an embodiment of a method for selecting a reading object in the field of view.

FIG. 6B is a flowchart of an embodiment of a method for displaying the one or more literary content items with their respective print layout characteristics registered to the reading object in the field of view.

FIG. 13A is a flowchart of an embodiment of a method for augmenting a user selection within a virtual copy of a literary content item with virtual augmentation data and saving the virtual augmentation data for retrieval for any other copy of the literary content item.

FIG. 13B is a flowchart of an embodiment of a method for displaying stored augmentation data entered for the user selection within the virtual copy of the literary content item for another copy of the literary content item having different layout characteristics.

DETAILED DESCRIPTION

Figure 3:
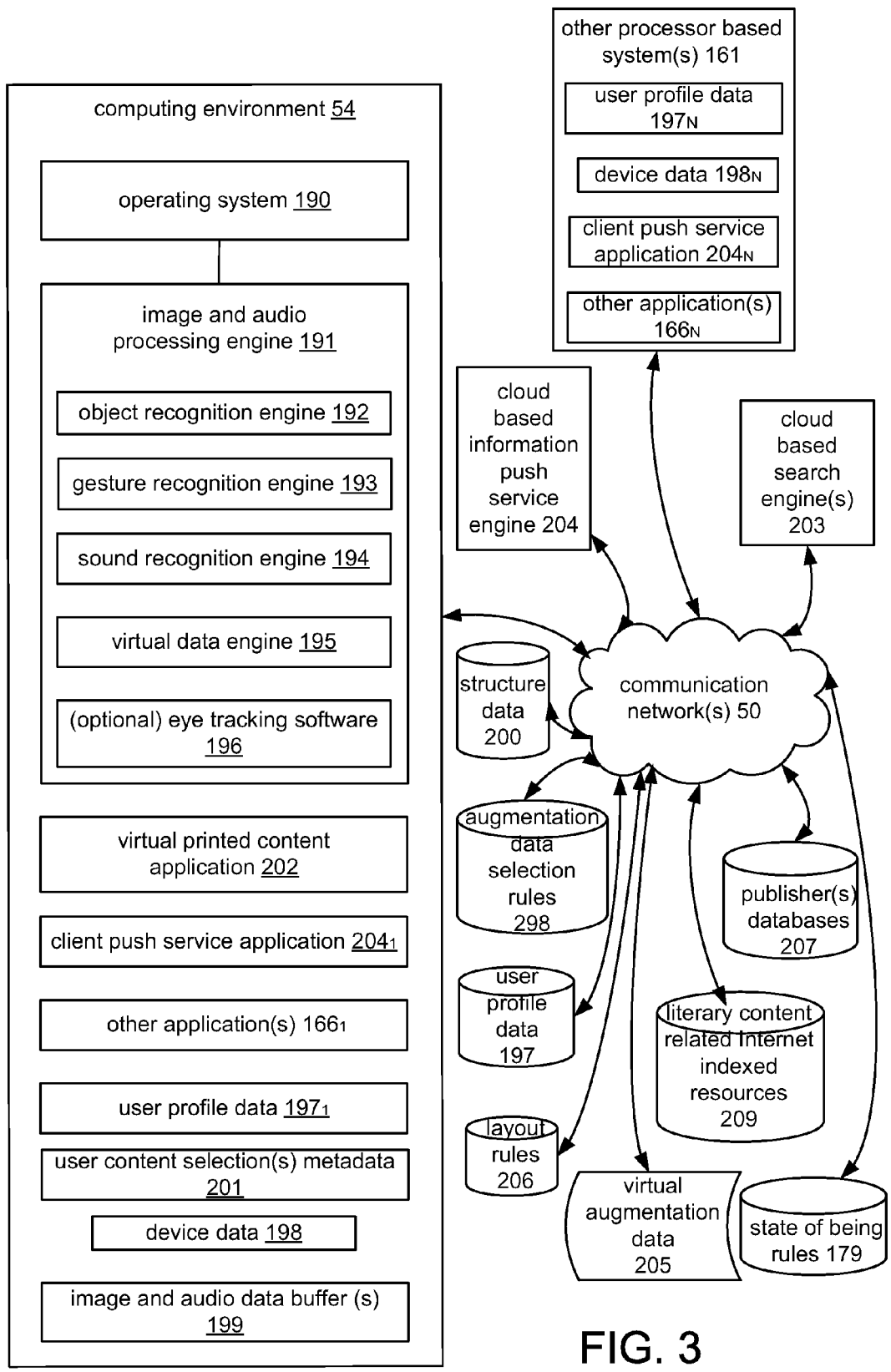
FIG. 3 is a block diagram of a system from a software perspective for providing a mixed reality user interface by a see-through, mixed reality display device system in which software for displaying virtual data as printed content can operate.

The technology provides various embodiments for displaying virtual data as printed content by a see-through, near-eye, mixed reality display device system. As mentioned above, in some embodiments, the see-through display device system identifies a real reading object like a real piece of paper, a notebook, a real book, magazine, newspaper or other real material upon which text for reading literary content is printed. Object recognition software can identify the real reading object from image data captured by front facing cameras positioned on the display device system to capture objects in the field of view of the display device which approximates the user field of view when looking through the display device. In some examples, the real reading object is blank, like a blank piece of paper, and the content of the literary content item is displayed to appear as if printed on the object. For example, the blank piece of paper now appears in the display as a printed page including at least a portion of the literary content item. As a real reading object may not be available, a virtual reading object can also be displayed as the reading object. The display of the reading object is updated responsive to user physical action often to display virtual augmentation data, some examples of which are interactive content, user generated annotations, and data from a user search request related to a selection of the literary content item a user has focused on.

In some instances, eye gaze data identifies where a user is focusing in the field of view, and can thus identify at which portion of the literary content item a user is looking. A gaze duration on a portion of the literary content item can identify the portion as a user content selection. Gaze duration is an example of a physical action of a user using a body part. A gesture performed by a user body part such as a hand or finger and captured in image data is also an example of physical action user input. A blink or blinking sequence of an eye can also be a gesture. A pointing or particular movement gesture by a hand, finger or other body part can also indicate a user content selection like a word, sentence, paragraph or photograph. A user generated sound command such as a voice command may also be considered an example of a physical action indicating user input. Sound based actions typically accompany other physical actions like a gesture and eye gaze.

Once the user selects a picture or text, different tasks or applications can be executed with respect to the user content selection like augmentation with interactive games and holograms, replacement of character and location names with names of the user's friends and associated locations, and annotation using virtual data, either three dimensional, two dimensional or both.

FIG. 1A is a block diagram depicting example components of an embodiment of a see-through, augmented or mixed reality display device system. System 8 includes a see-through display device as a near-eye, head mounted display device 2 in communication with a processing unit 4 via a wire 6 in this example or wirelessly in other examples. In this embodiment, head mounted, display device 2 is in the shape of eyeglasses in a frame 115, with a display optical system 14 for each eye in which image data is projected into a user's eye to generate a display of the image data while a user also sees through the display optical systems 14 for an actual direct view of the real world.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through display.

Frame 115 provides a support structure for holding elements of the system in place as well as a conduit for electrical connections. In this embodiment, frame 115 provides a convenient eyeglass frame as support for the elements of the system discussed further below. The frame 115 includes a nose bridge portion 104 with a microphone 110 for recording sounds and transmitting audio data in this embodiment. A temple or side arm 102 of the frame rests on each of a user's ears. In this example, the right temple 102r includes control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing cameras 113 for recording digital images and videos and transmitting the visual recordings to the control circuitry 136 which may in turn send the captured image data to the processing unit 4 which may also send the data to one or more computer systems 12 over a network 50.

The processing unit 4 may take various embodiments. In some embodiments, processing unit 4 is a separate unit which may be worn on the user's body, e.g. a wrist, or be a separate device like the illustrated mobile device 4 as illustrated in FIG. 1C. The processing unit 4 may communicate wired or wirelessly (e.g., WiFi, Bluetooth, infrared, RFID transmission, wireless Universal Serial Bus (WUSB), cellular, 3G, 4G or other wireless communication means) over a communication network 50 to one or more computing systems 12 whether located nearby or at a remote location. In other embodiments, the functionality of the processing unit 4 may be integrated in software and hardware components of the display device 2 as in FIG. 1B.

Figure 15:
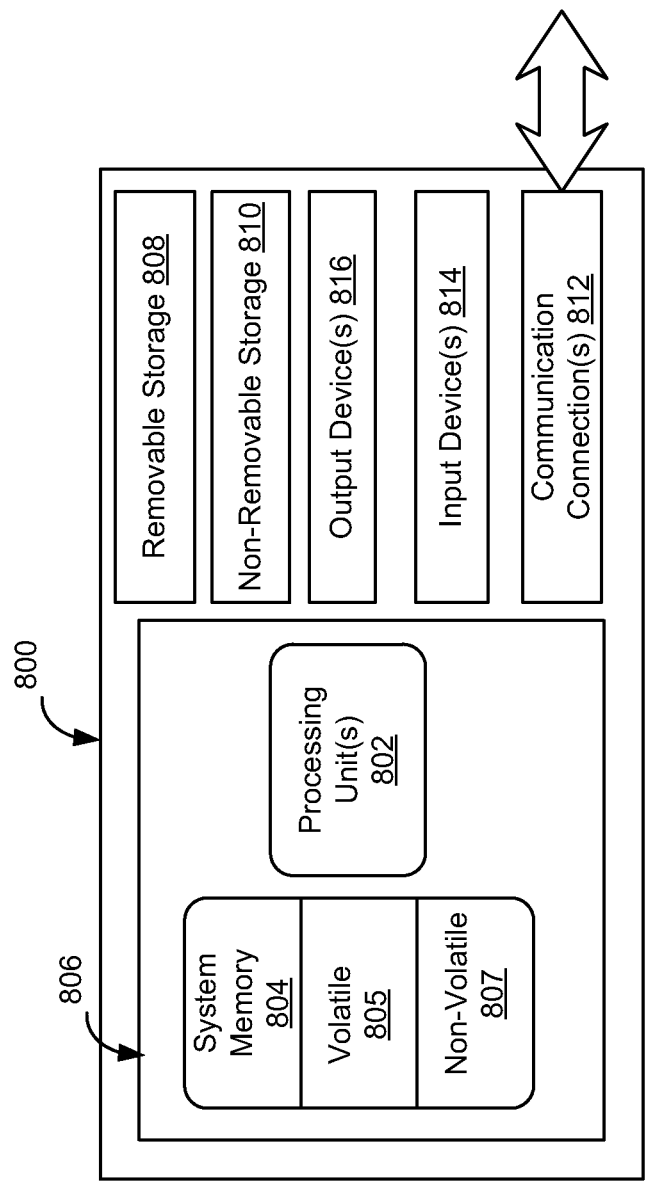
FIG. 15 is a block diagram of one embodiment of a computing system that can be used to implement a network accessible computing system.

A remote, network accessible computer system 12 may be leveraged for processing power and remote data access. An application may be executing on computing system 12 which interacts with or performs processing for display system 8, or may be executing on one or more processors in the see-through, mixed reality display system 8. An example of hardware components of a computing system 12 is shown in FIG. 15.

FIG. 1B is a block diagram depicting example components of another embodiment of a see-through, augmented or mixed reality display device system 8 which may communicate over a communication network 50 with other devices. In this embodiment, the control circuitry 136 of the display device 2 communicates wirelessly via a wireless transceiver (see 137 in FIG. 2A) over a communication network 50 to one or more computer systems 12.

FIG. 1C is a block diagram of another embodiment of a see-through, mixed reality display device system using a mobile device as a processing unit 4. Examples of hardware and software components of a mobile device 4 such as may be embodied in a smartphone or tablet computing device are described in FIG. 16. A display 7 of the mobile device 4 may also display data, for example menus, for executing applications and be touch sensitive for accepting user input. Some other examples of mobile devices 4 are a smartphone, a laptop or notebook computer, and a netbook computer.

FIG. 2A is a side view of an eyeglass temple 102 of the frame 115 in an embodiment of the see-through, mixed reality display device 2 embodied as eyeglasses providing support for hardware and software components. At the front of frame 115 is physical environment facing video camera 113 that can capture video and still images of the real world to map real objects in the field of view of the see-through display, and hence, in the field of view of the user. The cameras are also referred to as outward facing cameras meaning facing outward from the user's head. Each front facing camera 113 is calibrated with respect to a reference point of its respective display optical system 14 such that the field of view of the display optical system 14 can be determined from the image data captured by the respective camera 113. One example of such a reference point is an optical axis (see 142 in FIG. 2B) of its respective display optical system 14. The image data is typically color image data.

In many embodiments, the two cameras 113 provide overlapping image data from which depth information for objects in the scene may be determined based on stereopsis. In some examples, the cameras may also be depth sensitive cameras which transmit and detect infrared light from which depth data may be determined. The processing identifies and maps the user's real world field of view. Some examples of depth sensing technologies that may be included on the head mounted display device 2 without limitation, are SONAR, LIDAR, Structured Light, and/or Time of Flight.

Control circuits 136 provide various electronics that support the other components of head mounted display device 2. In this example, the right temple 102r includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU).

Inside, or mounted to temple 102, are ear phones 130, inertial sensors 132, one or more location or proximity sensors 144, some examples of which are a GPS transceiver, an infrared (IR) transceiver, or a radio frequency transceiver for processing RFID data. Optional electrical impulse sensor 128 detects commands via eye movements. In one embodiment, inertial sensors 132 include a three axis magnetometer 132A, three axis gyro 132B and three axis accelerometer 132C. The inertial sensors are for sensing position, orientation, and sudden accelerations of head mounted display device 2. From these movements, head position may also be determined. In this embodiment, each of the devices using an analog signal in its operation like the sensor devices 144, 128, 130, and 132 as well as the microphone 110 and an IR illuminator 134A discussed below, include control circuitry which interfaces with the digital processing unit 210 and memory 244 and which produces and converts analog signals for its respective device.

Mounted to or inside temple 102 is an image source or image generation unit 120 which produces visible light representing images. In one embodiment, the image source includes micro display 120 for projecting images of one or more virtual objects and coupling optics lens system 122 for directing images from micro display 120 to reflecting surface or element 124. The microdisplay 120 may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the micro display 120 into a lightguide optical element 112, which directs the light representing the image into the user's eye. Image data of a virtual object may be registered to a real object meaning the virtual object tracks its position to a position of the real object seen through the see-through display device 2 when the real object is in the field of view of the see-through displays 14.

FIG. 2B is a top view of an embodiment of one side of a see-through, near-eye, mixed reality display device including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system includes a light guide optical element 112, opacity filter 114, and optional see-through lens 116 and see-through lens 118. The opacity filter 114 for enhancing contrast of virtual imagery is behind and aligned with optional see-through lens 116, lightguide optical element 112 for projecting image data from the microdisplay 120 is behind and aligned with opacity filter 114, and optional see-through lens 118 is behind and aligned with lightguide optical element 112. More details of the light guide optical element 112 and opacity filter 114 are provided below.

Light guide optical element 112 transmits light from micro display 120 to the eye 140 of the user wearing head mounted, display device 2. Light guide optical element 112 also allows light from in front of the head mounted, display device 2 to be transmitted through light guide optical element 112 to eye 140, as depicted by arrow 142 representing an optical axis of the display optical system 14r, thereby allowing the user to have an actual direct view of the space in front of head mounted, display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a waveguide, a planar waveguide in this embodiment. A representative reflecting element 126 represents the one or more optical elements like mirrors, gratings, and other optical elements which direct visible light representing an image from the planar waveguide towards the user eye 140.

Infrared illumination and reflections, also traverse the planar waveguide 112 for an eye tracking system 134 for tracking the position of the user's eyes. The position of the user's eyes and image data of the eye in general may be used for applications such as gaze detection, blink command detection and gathering biometric information indicating a personal state of being for the user. The eye tracking system 134 comprises an eye tracking illumination source 134A and an eye tracking IR sensor 134B positioned between lens 118 and temple 102 in this example. In one embodiment, the eye tracking illumination source 134A may include one or more infrared (IR) emitters such as an infrared light emitting diode (LED) or a laser (e.g. VCSEL) emitting about a predetermined IR wavelength or a range of wavelengths. In some embodiments, the eye tracking sensor 134B may be an IR camera or an IR position sensitive detector (PSD) for tracking glint positions.

The use of a planar waveguide as a light guide optical element 112 in this embodiment allows flexibility in the placement of entry and exit optical couplings to and from the waveguide's optical path for the image generation unit 120, the illumination source 134A and the IR sensor 134B. In this embodiment, a wavelength selective filter 123 passes through visible spectrum light from the reflecting surface 124 and directs the infrared wavelength illumination from the eye tracking illumination source 134A into the planar waveguide 112 through wavelength selective filter 125 passes through the visible illumination from the micro display 120 and the IR illumination from source 134A in the optical path heading in the direction of the nose bridge 104. Reflective element 126 in this example is also representative of one or more optical elements which implement bidirectional infrared filtering which directs IR illumination towards the eye 140, preferably centered about the optical axis 142 and receives IR reflections from the user eye 140. Besides gratings and such mentioned above, one or more hot mirrors may be used to implement the infrared filtering. In this example, the IR sensor 134B is also optically coupled to the wavelength selective filter 125 which directs only infrared radiation from the waveguide including infrared reflections of the user eye 140, preferably including reflections captured about the optical axis 142, out of the waveguide 112 to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Another embodiment for tracking the direction of the eyes is based on charge tracking. This concept is based on the observation that a retina carries a measurable positive charge and the cornea has a negative charge. Sensors 128, in some embodiments, are mounted by the user's ears (near earphones 130) to detect the electrical potential while the eyes move around and effectively read out what the eyes are doing in real time. (See *Control your mobile music with eyeball-activated earphones!*, Feb. 19, 2010 http://www.wirefresh.com/control-your-mobile-music-with-eyeball-actvated-headphones, which is hereby incorporated by reference.) Eye blinks may be tracked as commands. Other embodiments for tracking eyes movements such as blinks which are based on pattern and motion recognition in image data from the small eye tracking camera 134B mounted on the inside of the glasses, can also be used. The eye tracking camera 134B sends buffers of image data to the memory 244 under control of the control circuitry 136.

Opacity filter 114, which is aligned with light guide optical element 112, selectively blocks natural light from passing through light guide optical element 112 for enhancing contrast of virtual imagery. When the system renders a scene for the mixed reality display, it takes note of which real-world objects are in front of which virtual objects and vice versa. If a virtual object is in front of a real-world object, then the opacity is turned on for the coverage area of the virtual object. If the virtual object is (virtually) behind a real-world object, then the opacity is turned off, as well as any color for that display area, so the user will only see the real-world object for that corresponding area of real light. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame.

Again, FIGS. 2A and 2B only show half of the head mounted display device 2. A full head mounted display device would include another set of optional see-through lenses 116 and 118, another opacity filter 114, another light guide optical element 112, another micro display 120, another lens system 122 physical environment facing camera 113 (also referred to as outward facing or front facing camera 113), eye tracking assembly 134, earphones 130, and sensors 128 if present. Additional details of a head mounted display 2 are illustrated in U.S. patent application Ser. No. 12/905,952 entitled Fusing Virtual Content Into Real Content, Filed Oct. 15, 2010, fully incorporated herein by reference.

FIG. 3 illustrates a computing environment embodiment from a software perspective which may be implemented by the display device system 8, a remote computing system 12 in communication with the display device system or both. Network connectivity allows leveraging of available computing resources. The computing environment 54 may be implemented using one or more computer systems. As shown in the embodiment of FIG. 3, the software components of a computing environment 54 include an image and audio processing engine 191 in communication with an operating system 190. Image and audio processing engine 191 includes object recognition engine 192, gesture recognition engine 193, sound recognition engine 194, virtual data engine 195, and, optionally eye tracking software 196 if eye tracking is in use, all in communication with each other. Image and audio processing engine 191 processes video, image, and audio data received from a capture device such as the outward facing cameras 113. To assist in the detection and/or tracking of objects, an object recognition engine 192 of the image and audio processing engine 191 may access one or more databases of structure data 200 over one or more communication networks 50.

Virtual data engine 195 processes virtual objects and registers the position and orientation of virtual objects in relation to one or more coordinate systems. Additionally, the virtual data engine 195 performs the translation, rotation, scaling and perspective operations using standard image processing methods to make the virtual object appear realistic. A virtual object position may be registered or dependent on a position of a corresponding object which may be real or virtual. The virtual data engine 195 determines the position of image data of a virtual object in display coordinates for each display optical system 14. The virtual data engine 195 may also determine the position of virtual objects in various maps of a real-world environment stored in a memory unit of the display device system 8 or of the computing system 12. One map may be the field of view of the display device with respect to one or more reference points for approximating the locations of the user's eyes. For example, the optical axes of the see-through display optical systems 14 may be used as such reference points. In other examples, the real-world environment map may be independent of the display device, e.g. a 3D map or model of a location (e.g. store, coffee shop, museum).

One or more processors of the computing system 12, or the display device system 8 or both also execute the object recognition engine 192 to identify real objects in image data captured by the environment facing cameras 113. As in other image processing applications, a person can be a type of object. For example, the object recognition engine 192 may implement pattern recognition based on structure data 200 to detect particular objects including a human. The object recognition engine 192 may also include facial recognition software which is used to detect the face of a particular person.

Structure data 200 may include structural information about targets and/or objects to be tracked. For example, a skeletal model of a human may be stored to help recognize body parts. In another example, structure data 200 may include structural information regarding one or more inanimate objects in order to help recognize the one or more inanimate objects. The structure data 200 may store structural information as image data or use image data as references for pattern recognition. The image data may also be used for facial recognition.

In particular, the structure data 200 includes data for identifying different types of reading objects. Object recognition as mentioned relies on filters applied to characteristics of an object like its size, shape and motion characteristics as may be identified in a motion capture file generated by field of view image data from the front facing cameras 113. These different characteristics are weighted, and a probability is assigned whether an image object is a reading object or other type of object. If the probability satisfies a criteria, a reading object type is assigned to the object.

Paper, books, newspapers, professional journals and magazines have many standardized features. For example, they typically come in standard sizes, for example standard page sizes. Furthermore, the shape of a page of a reading object tends to be rectangular in shape. The material composition of paper varies, but there are standards of material compositions. For example, a certain grade of hard white ledger paper may contain virtually no groundwood paper while newsprint paper is paper made from groundwood. Some types of paper may be bleached or unbleached. The standardized material compositions of papers have different reflectivities which can be measured from IR or color image data captured by the front facing cameras, which in some instances are also depth cameras. As a user, even if not holding a reading object, manipulates the reading object with at least one hand, the interaction with the hand can be captured in image data to see if page movement of a particular reading object matches a motion profile of a type of reading object. Furthermore, there may be some text on the reading object already. The text amount, placement on the object and orientation on the object are also factors identifying a type of reading object.

Furthermore, some reading objects like a blank page or a blank book may include a marker on its cover or page which includes identifying data or a reference identifier for accessing identifying data from a remotely executing application. Some examples of identifying data for a reading object are its page connection side, page dimensions, cover dimensions, number of pages, and color of pages, thickness of pages, line color and thickness if lines included. A marker may be an invisible marker like an RFID tag or an IR retroreflective tag which an IR or RFID transceiver unit 144 may detect and send to the processing unit 210 of control circuitry 136 to read its data for the object recognition engine 192 and the virtual printed content application 202. A marker may also be a visible marker which can act as a reference identifier as described above.

For determining some physical characteristics of a real reading object like a number of pages, the object recognition engine 192 can cause the virtual data engine 195 to generate audio for or display a request for clarification of the number of pages.

In another example, certain text on a reading object itself can be identified by the object recognition engine 192 and parsed to identify physical characteristics. The structure data 200 may include one or more image datastores including images of numbers, symbols (e.g. mathematical symbols), letters and characters from alphabets used by different languages. Additionally, structure data 200 may include handwriting samples of the user for identification.

For example, a reading object may be identified as a notebook type of reading object. Notebooks typically have a number of sheets of paper and the page size printed on their covers. They may also have words like "college ruled" indicating the notebook is ruled and has a standard line spacing. In other examples, the object recognition engine 192 may convert printed text on the reading object or within its pages in the image data to a searchable computer standard text format like Unicode and search publisher (207) and Internet indexed resources (209) datastores for identifying data like page size and a number of pages. Such text may include data which identifies the content printed on the object like a title, author, publisher, and edition. Other text which may be used to identify physical characteristics are an International Standard Book Number (ISBN) which identifies the specific book, an International Standard Serial Number (ISSN) which identifies the title of a periodical and a Serial Item and Contribution Identifier (SICI) which is a standard used to identify specific volumes, articles or other identifiable parts of the periodical. Searching based on this data identifying content returns information on the physical characteristics of the reading object. The content itself will be overlaid with the requested literary content.

Upon detection of one or more objects by the object recognition engine 192, image and audio processing engine 191 may report to operating system 190 an identification of each object detected and a corresponding position and/or orientation which the operating system 190 passes along to an application like virtual printed content application 202.

The sound recognition engine 194 processes audio such as voice commands received via microphone 110.

The outward facing cameras 113 in conjunction with the object recognition engine 192 and gesture recognition engine 193 implements a natural user interface (NUI) in embodiments of the display device system 8. Blink commands or gaze duration data identified by the eye tracking software 196 are also examples of physical action user input. Voice commands may also supplement other recognized physical actions such as gestures and eye gaze.

The gesture recognition engine 193 can identify actions performed by a user indicating a control or command to an executing application. The action may be performed by a body part of a user, e.g. a hand or finger typically in reading applications, but also an eye blink sequence of an eye can be gestures. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, a camera, in particular a depth camera in the real environment separate from the display device 2 in communication with the display device system 8 or a computing system 12 may detect the gesture and forward a notification to the system 8, 12. In other examples, the gesture may be performed in view of the cameras 113 by a body part such as the user's hand or one or more fingers.

In some examples, matching of image data to image models of a user's hand or finger during gesture training sessions may be used rather than skeletal tracking for recognizing gestures.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The computing environment 54 also stores data in image and audio data buffer(s) 199. The buffers provide memory for receiving image data captured from the outward facing cameras 113, image data from an eye tracking camera of an eye tracking assembly 134 if used, buffers for holding image data of virtual objects to be displayed by the image generation units 120, and buffers for audio data such as voice commands from the user via microphone 110 and instructions to be sent to the user via earphones 130.

Device data 198 may include a unique identifier for the computer system 8, a network address, e.g. an IP address, model number, configuration parameters such as devices installed, identification of the operating system, and what applications are available in the display device system 8 and are executing in the display system 8 etc. Particularly for the see-through, mixed reality display device system 8, the device data may also include data from sensors or determined from the sensors like the orientation sensors 132, the temperature sensor 138, the microphone 110, the electrical impulse sensor 128 if present, and the location and proximity transceivers 144.

In this embodiment, the display device system 8 and other processor based systems 161 used by the user execute a client side version of a push service application 204N which communicates over a communication network 50 with an information push service engine 204. The information push service engine 204 is cloud based in this embodiment. A cloud based engine is one or more software applications which execute on and store data by one or more networked computer systems. The engine is not tied to a particular location. Some examples of cloud based software are social networking sites and web-based email sites like Yahoo!® and Hotmail®. A user may register an account with the information push service engine 204 which grants the information push service permission to monitor the user's executing applications and data generated and received by them as well as user profile data 197, and device data 198 for tracking the user's location and device capabilities. Based on the user profile data aggregated from the user's systems 8, 161, the data received and sent by the executing applications on systems 8, 161 used by the user, and location and other sensor data stored in device data $198_1, 198_N$, the information push service 204 can determine a physical context, a social context, a personal context like a state of being or a combination of contexts for the user.

The local copies of the user profile data $197_1, 197_N$ may store some of the same user profile data 197 and the client side push service applications $204_1$ may periodically update their local copies with the user profile data stored by the computer system 12 in an accessible database 197 over a communication network 50. Some examples of user profile data 197 are the user's expressed preferences, the user's friends' list, the user's preferred activities, the user's favorites, some examples of which are, favorite color, favorite foods, favorite books, favorite author, etc., a list of the user's reminders, the user's social groups, the user's current location, and other user created content, such as the user's photos, images and recorded videos. In one embodiment, the user-specific information may be obtained from one or more data sources or applications such as the information push service 204, a user's social networking sites, contacts or address book, schedule data from a calendar application, email data, instant messaging data, user profiles or other sources on the Internet as well as data directly entered by the user. As discussed below, a state of being may be derived from eye data and be updated and stored in the user profile data 197 both locally and by the remote push service application 204. In this embodiment, a network accessible state of being rules 179 links identified eye data with a state of being as a reference for deriving the state of being.

Trust levels may be determined by user profile data 197 which identifies people known to the user, for example as social networking friends and family members sharing the same gaming service, which may be subdivided into different groups based on trust levels. Additionally, the user may explicitly identify trust levels in their user profile data 197 using a client side push service application 204N. In one embodiment, the cloud based information push service engine 204 aggregates data from user profile data $197_N$ stored on the different user computer systems 8, 161 of the user.

Each version of the push service application 204 also stores in user profile data 197 a tracking history of the user. Some examples of events, people and things tracked in the tracking history are locations visited, transactions, content and real things purchased, a reading history, a viewing history including viewings of television, movies, and videos, and people detected with whom the user has interacted. If electronically identified friends (e.g. social networking friends) are registered with the push service application 204 too, or they make information available to the user or publicly through other applications 166, the push service application 204 can use this data as well to track the content and social context of the user.

Figure 4A:
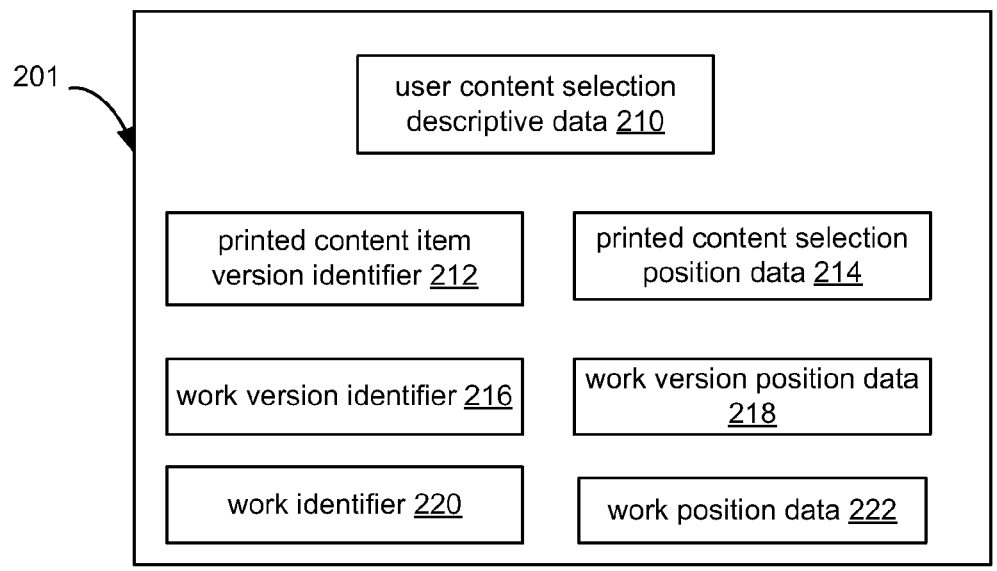
FIG. 4A illustrates an example of a user content selection metadata record.

As discussed further below, the virtual printed content application 202 may access one or more search engines 203 for identifying print layout characteristics available for a literary content item as well as virtual augmentation data 205 related to a literary content item or a particular user content selection within the literary content item. Examples of resources which may be searched for identification and pertinent virtual data are illustrated as publisher databases 207 and literary content related resources 209 indexed for Internet searching. For example, a general purpose search engine like Bing® or Google® may be accessed as well as a search engine for the Library of Congress, university libraries or publisher databases made available to the public or on a subscription basis as may be identified in user profile data. Publishers may have pointers to virtual augmentation data 205 in their databases 207 as publishers may have a business model for encouraging virtual augmentation data 205 to be developed for augmenting their copyrighted material. Additionally, entities not associated with the publishers or who wish to maintain their own data resources may wish to make virtual augmentation data 205 available through their own websites which are Internet indexed resources. Metadata 201 for a user content selection can be filled with values based on searches of the publishers and Internet indexed resource datastores 207, 209. FIG. 4A, discussed below, provides an example of a user content selection metadata record.

Once print layout characteristics are identified, the virtual printed content application 202 generates one or more page layouts as discussed below based on layout rules 206, which in this example are stored in a network accessible data storage device. The layout rules 206 implement page layout criteria. The layout rules may be initially developed by a graphic designer familiar with different publishing formats and programmed and stored in a database for automatic implementation by a processing unit 210 executing the virtual printed content application 202. Some examples of criteria include visibility criteria, publisher rules on which layout characteristics are adjustable and which are not, and spacing constraints. Some layout rules may implement a certain number of panels or blocks on a page wherein each block displays a respective literary content item, and length and width adjustment ranges for the blocks. Standardized or typical spacing constraints for different types of media like books and magazines may be implemented as well as publisher specific spacing constraints. Some examples of spacing constraints may be a minimum number of words to fit on a line, a minimum percentage of a literary content item or section of a literary content item is to appear in order for the literary content item to be included in a page layout with other items, and a picture or photograph is to fit completely on a page in order to be included in a page layout. These are just some examples of graphic design or layout rules which may be implemented.

Some examples of visibility criteria can be the size of the text or pictorial content in the field of view. If too small or too large, the size of the content can be adjusted to a comfortable level. A depth distance of a real reading object can be determined from IR data captured by 3D versions of the cameras 113 or photogrammetry based on 2D images from the cameras 113. The depth distance can indicate reading material is too close or too far away, and font size for example can be adjusted to accommodate for the distance. The visibility criteria may be based on the user's actual eyesight if a prescription has been uploaded, eyesight typical for a user's age or based on average eyesight characteristics for humans.

The graphic design of a printed publication often results in print layout characteristics which act as a source attribute, meaning the print layout characteristics identify either the publisher or the periodical name as the source of the content. Some print layout characteristics may even be protected by a trademark. For example, a size and font for front page and secondary headlines may be widely identified with a certain newspaper. Additionally, some newspapers use a column format with actual column lines and columns of fixed size while others use more of a block style with articles formatted into columns of various size within the blocks and no column lines. Some examples of adjustable characteristics are text size, perhaps within a range, column spacing for some publishers, and allowing content to be displayed across pages. Some publisher constraints may not allow adjustment of column width but provide layout rules allowing font size change within the column. For book publishers, the number of pages and font size may be adjustable.

Besides displaying the virtual literary content requested, the virtual printed content application 202 can query one or more search engines 203 to search for virtual augmentation data 205 for the user content selection based on the literary content item including it. In some instances, the virtual augmentation data 205 is data specifically generated for appearing in relation to the user content selection as laid out in a specific printed version, for example on a particular page of a book or other subdivision of printed material. For example, a publisher, who has the layout of a book stored in its databases can supply interactive games and other content for a book at predetermined positions on a page and for specific pages.

In some embodiments, the virtual augmentation data 205 is associated with a work or a work version including the user content selection independent of the medium expressing the content. For example, paper or other printable material is an example of a medium. Another medium expressing a work is an electronic display or audio recording.

In other examples, virtual augmentation data 205 is tied to a medium independent work or work version. For example, a professor may store her notes she has made at different points in her virtual copy of a textbook to be available for any version of the textbook independent of medium. In other words, the content of the textbook is a work. Current, previous and future versions of the textbook are versions of the work. The virtual printed content application 202 links each note to a subdivision of the work in a medium independent organization of the work. For example, a note may be linked to a phrase in a particular paragraph which can be identified by executing software instructions for text matching. A paragraph is a medium independent subdivision while a page is dependent on the particular printing or electronic layout. A real paperback copy of a textbook with smaller print and a different number of pages is a different print version from a hardback copy of the textbook in larger print although they contain the exact same version of the textbook content, and thus has the same work version. The professor may allow her virtual notes to be available for storage or streaming, at her discretion, to students who take her class or past students by granting permission and access to them.

Responsive to available virtual augmentation data selections being identified, the virtual printed content application 202 selects virtual augmentation data from the candidates of available virtual augmentation data selections based on augmentation data selection rules 298 stored in accessible memory which can be local but which can also be network accessible. The augmentation data selection rules 298 provide logic for identifying pertinent user data in user profile data 197 related to the literary content item or user content selection and the available candidates of augmentation data.

FIG. 4A illustrates an example of a user content selection metadata record which includes user content selection descriptive data 210, a printed content item version identifier 212, printed content selection position data 214, a work version identifier 216 and work version position data 218 if applicable, a work identifier 220 and work position data 222. The work identifier 220 identifies the work embodied by the literary content item independent of a particular medium. The work position data 222 identifies one or more locations of the user content selection in terms of one or more medium independent subdivisions like paragraphs, stanzas, verses, etc. A work version identifier 216 may be included to describe different versions or editions of the work 210, for example translations, also independent of a particular format or medium. The work version position 218 may also be defined in terms of one or more medium independent subdivisions. A literary content item is a work or a work version. The printed content item version identifier 212 identifies a particular printed edition of a particular printed layout. The printed version identifier 212 is tied to the medium of paper or other material which is physically printed. The printed content selection position data 214 may be in terms of a specific static printed layout location like a page or a position on a page.

For example, the poem "Beowulf" is a work. The original old English form of the poem is a work version, as would be a version which has substituted modern English terms for some of the words. Another example of a version would be a French translation. Another example would be the original old English poem footnoted with comments. A printed version identifier 212 may identify a printed version of the poem on one or more sheets of vellum maintained in a library. This printed version would also have the work version identifier for the original old English form and the work identifier for Beowulf associated with it. A different printed content item version identifier 212 identifies an anthology of English literature which has printed the version of Beowulf footnoted with comments beginning on its page 37. This different printed version has a different printed content item version identifier 212 and work version identifier than the original old English form of the poem, but has the same work identifier. For content within the anthology version of the poem selected by a user, the position data of the user content selection is in terms of page 37. In this instance, likely, the work version position data 218 and the work position data 222 indicate the same stanza.

Figure 4B:
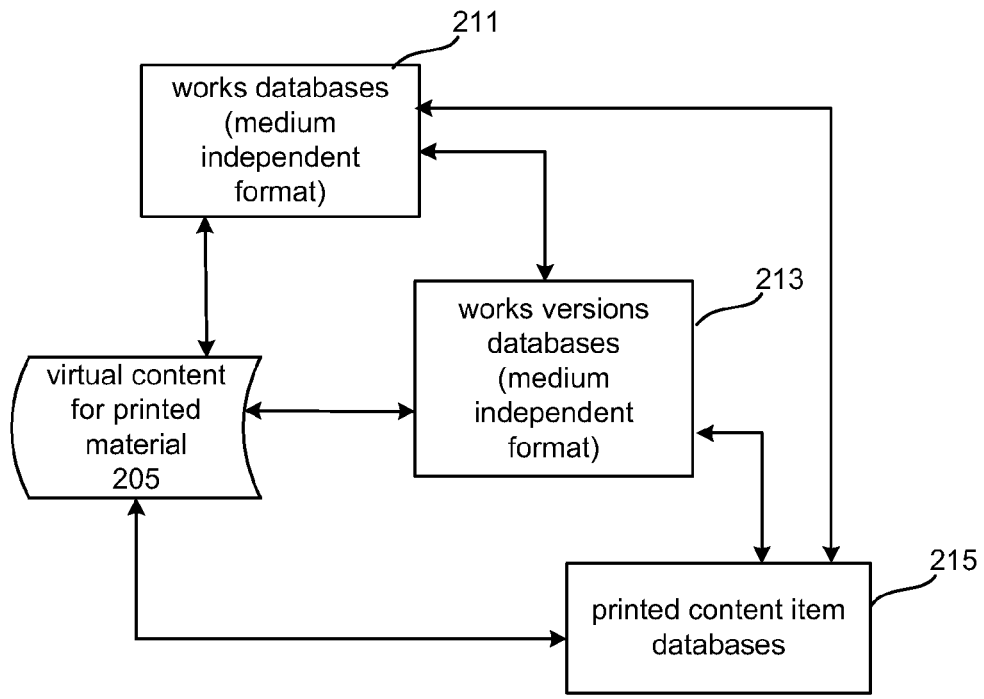
FIG. 4B illustrates examples of cross referencing printed medium dependent and medium independent content datastores.

FIG. 4B illustrates examples of printed medium dependent and medium independent content datastores, shown here as cross referencing databases. These databases 211, 213, 215 provide access to particular layouts including the content selection. The layouts may be medium independent and medium dependent. In this example, any of the printed content item version identifier 212, the work version identifier 216 or the work identifier 220 can be used to cross-reference or index into any of the medium independent works 211 and works versions databases 213 and the medium dependent or layout specific printed content item databases 215. The layouts which also identify position data of a work, any work versions and the various printed content item versions of the work are crossed referenced as well. Again, some examples of medium independent subdivision identifiers may be paragraphs, stanza, verses or the like which provide a medium independent organization to the literary content item which again is identified as a work or a work version. Paragraph 80 in a work can be cross-referenced to page 16 in one printed content item version and to page 24 in a larger print edition of the work in another printed content item version. Via the printed content item version identifier 212, a developer can link to the print layout of the print version, e.g. a particular edition, in the printed content items databases 215. Print layout includes things like page numbers, margin width, header and footer page content, font size, location of illustrations and photographs and their size on the page and other such layout specific information.

Publishers may provide access to their datastores of copyrighted works for identification purposes and as a reference for the layout of the work, work version or printed version for developers of virtual augmentation data. By being able to access the layout of the works, particular work versions and particular printed content item versions, developers can create virtual augmentation data 205 for medium independent and medium dependent versions of a work. As illustrated, the databases 211, 213 and 215 and the virtual augmentation data 205 may cross-reference each other.

For works not subject to copyright, datastores under control of libraries, particularly those with large collections like the Library of Congress, other national libraries, universities, and large public libraries, and book compilation websites like Google Books® and sites maintained by universities may be searched for copies of a work, a work version or a printed content version for layouts to which to reference position data 214, 218, 222.

Embodiments of methods for the technology and example implementation processes for some of the steps of the methods are presented in figures below. For illustrative purposes, the method embodiments below are described in the context of the system embodiments described above. However, the method embodiments are not limited to operating in the system embodiments described above and may be implemented in other system embodiments.

Figure 5:
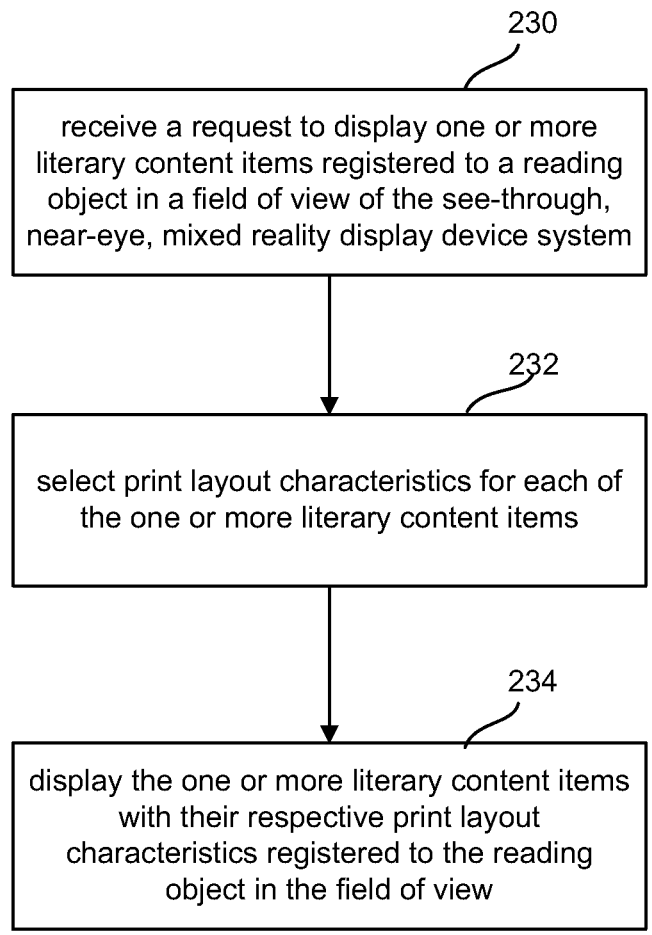
FIG. 5 is a flowchart of an embodiment of a method for displaying virtual data as printed content.

FIG. 5 is a flowchart of an embodiment of a method for displaying virtual data as printed content. In step 230, the virtual printed content application 202 receives a request to display one or more literary content items registered to a reading object in a field of view of the see-through, near-eye, mixed reality display device system. For example, the client push service application $204_1$ receives feeds of articles from Really Simple Syndication (RSS) or in another other format for Internet feeds. Either version of the push service application 204, 2041 orders or groups the articles in accordance with user preferences. For example, by monitoring and storing the reading and media viewing history of the user, metadata for articles received or their text may be searched for matches with metadata for entries in the reading and viewing history. Through collaborative filtering based or other heuristic based algorithms, topics of interest to the user are prioritized.

In step 232, the virtual printed content application 202 selects print layout characteristics for each of the one or more literary content items. As discussed below, in the selection process, the virtual printed content application 202 may access publisher datastores which may have been identified in metadata for the literary content item. If not, default print layout characteristics may be selected based on one or more reading objects associated with the literary content items. For example, a poem may be associated with reading objects of book, magazine, literary magazine, and a page. Additionally, although a reading object may not be listed in the descriptive metadata 210 of a literary content item, another type of reading object may be selected. In step 234, the one or more literary content items are displayed with their respective print layout characteristics registered to the reading object in the field of view 234.

Print layout selection and display of the literary content items are effected by the nature of the reading object as real or virtual. FIG. 6A is a flowchart of an embodiment of a method for selecting a reading object in the field of view. In step 242, the virtual printed content application 202 determines whether physical action has been detected indicating user selection of a real reading object. Such a determination may be based on metadata generated and stored by the object recognition engine 192 for an object satisfying a filter for a type of reading object. The user selection based on physical action may be based on a position of the object in relation to a position of a user's hand identified by another set of object metadata as determined by the object recognition engine 192 from field of view image data from cameras 113. For a physical action of a gesture, the gesture recognition engine 193 may have also identified a selection gesture of the reading object in the field of view image data. Furthermore a point of gaze position in the field of view as determined by the eye tracking software based on eye image data, data identifying what is being displayed on the display, and the field of view image data may also have identified selection of the real reading object. Voice data may be used in separately but typically in conjunction with a gesture or gaze to confirm or clarify a selection. Responsive to determining physical action has been detected indicating user selection of a real reading object, in step 244, the virtual printed content application 202 selects the real reading object as the reading object.

Responsive to user selection of a real reading object not being indicated, in step 246, the virtual printed content application 202 automatically selects a reading object type for a virtual reading object based on a reading object type associated with each requested literary content item. In some embodiments, a weighting scheme may be used. For example, if one of the literary items to be displayed is a novel associated with a reading object type of book and other requested items are poems associated with reading object types of a separate sheet of paper, a book and one or more types of periodical and another is a newspaper article, due to its higher percentage of overall content, a reading object type of book receives a weighting indicating a higher probability for selection than a newspaper or periodical. In step 248, the virtual printed content application 202 selects the virtual reading object as the reading object.

FIG. 6B is a flowchart of an embodiment of a method for displaying the one or more literary content items with their respective print layout characteristics registered to the reading object in the field of view. In step 252, the virtual printed content application 202 generates one or more page layouts including the one or more literary content items with their print layout characteristics in accordance with stored layout rules, and in step 254 displays the one or more pages based on the page layouts in the field of view of the see-through mixed reality display device system. In step 256, the virtual printed content application 202 changes the one or more pages displayed responsive to user physical action.

Figure 7A:
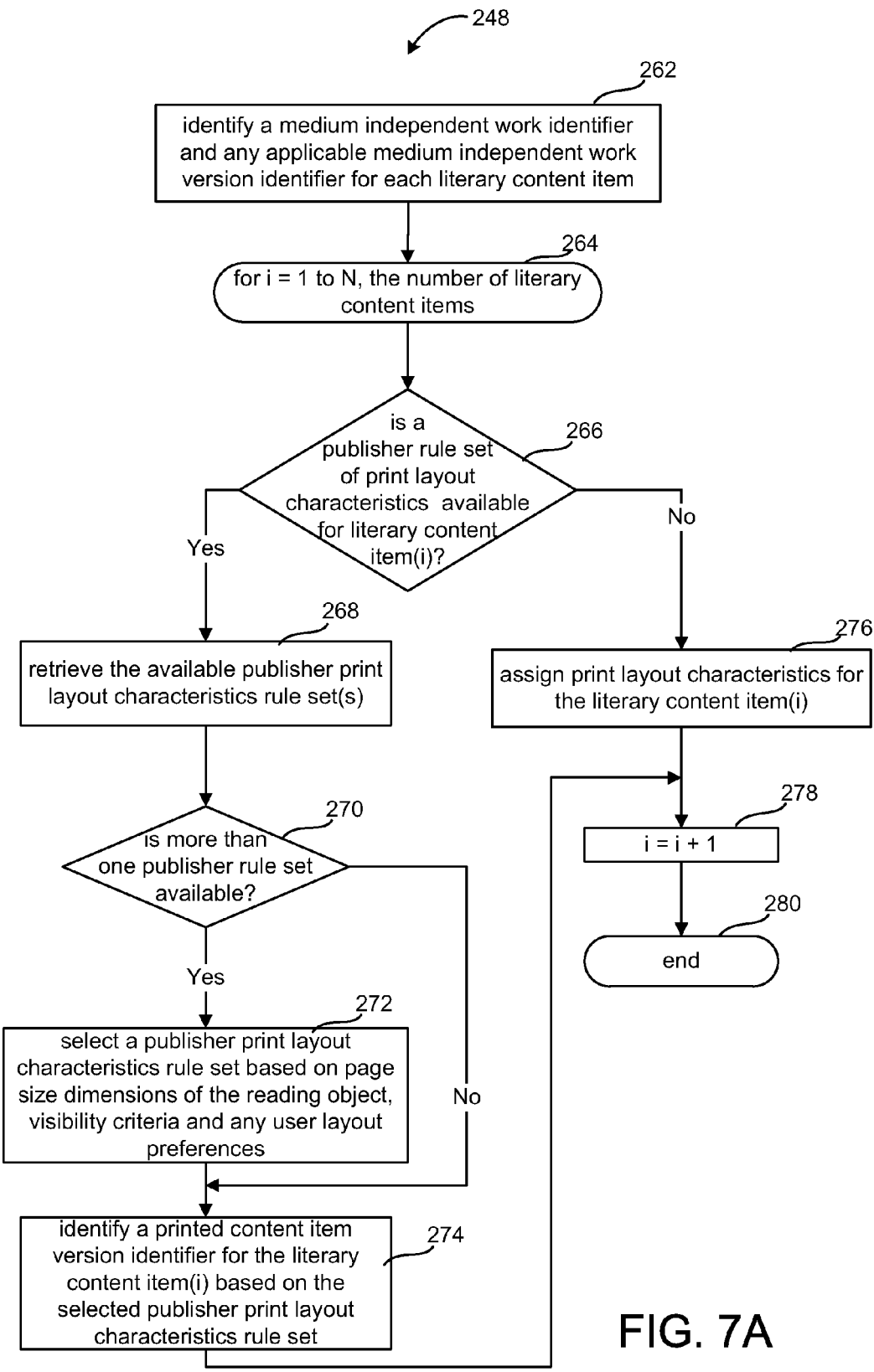
FIG. 7A is a flowchart of an implementation example of selecting print layout characteristics for each of the one or more literary content items.

FIG. 7A is a flowchart of an implementation example of selecting print layout characteristics for each of the one or more literary content items. A loop construct is used for illustrative purposes to show processing for each literary content item. Other processing constructs can be used. In step 262, the virtual printed content application 202 identifies a medium independent work identifier and any applicable medium independent work version identifier for each literary content item. For example, the metadata of the literary content item may include a work identifier or an applicable work version identifier or one or more data fields such as the title and author may be used as a work identifier. In step 264, the virtual printed content application 202 initializes a counter, i, for the number of literary content items and determines in step 266 whether there is a publisher rule set of print layout characteristics available for literary content item (i). For example, the virtual printed content application 202 searches publisher databases 207 based on the work identifier associated with the literary content item for identifying one or more available print layouts as are associated with printed versions of the literary content item. For certain items, the literary content itself or its metadata identifies its publisher source such as a periodical name and publisher name. For example an RSS feed providing an article from the New York Times includes New York Times as the source in the article's metadata. Similarly a source attribution for an article like Associated Press (AP) identifies that there are no print layout characteristics associated with the article as the Associate Press is a news service which newspapers and online news outlet subscribe and format the AP articles in their individual print or online layouts.

Responsive to a publisher rule set not being available, in step 276, the virtual printed content application 202 assigns print layout characteristics for the literary content item (i). In step 278, the counter i is updated, and in step 280 the loop continues until i=N+1.

Responsive to a publisher rule set being available, in step 268, the virtual printed content application 202 retrieves the available one or more publisher print layout characteristics rule sets and identifies and in step 270, determines whether more than one publisher rule set has been retrieved. If a single publisher rule set has been retrieved, the virtual printed content application 202 proceeds to step 274. If more than one publisher rule set has been retrieved, the virtual printed content application 202 in step 272 selects a publisher print layout characteristics rule set based on page size dimensions of the reading object, visibility criteria and any user layout preferences. For example, if the reading object selected is a book, a publisher print layout characteristics rule set which designates a page size about the page size of the reading object book is weighted more heavily in a selection algorithm the layouts for different page sizes. If user preferences have indicated a preferred user font in reading books, a layout with the preferred font receives a weighting. For visibility criteria, layouts with fonts too small for the user's comfort reading position or previously identified by the user as difficult for distinguishing the letters, will receive an unfavorable weighting.

In step 274, the virtual printed content application 202 identifies a printed content item version identifier for the literary content item (i) based on the selected publisher print layout characteristics rule set. Steps 278 and 280 are then performed.

Besides print layout characteristics and constraints imposed by publishers on them, there are also constraints on layout imposed by the work of the literary content item. For example, a novel is generally expressed in chapters and paragraphs. To display a novel without identifying chapters and paragraph indentations would not only be very difficult to read due to visual processing by the human eye but would also effect how readily a reader comprehends a point being made or who is speaking. A Haiku poem has seventeen syllables and is typically presented as three lines with the first and third being of five syllables and the middle being of seven. A sonnet has fourteen lines. Typically, there is line spacing between stanzas of poems. In these examples, the number of lines and separation into paragraphs are part of the layout of the work which constrains all printed layouts. The size of the line spacing and the size of the paragraph indentations may vary in print layouts.

Figure 7B:
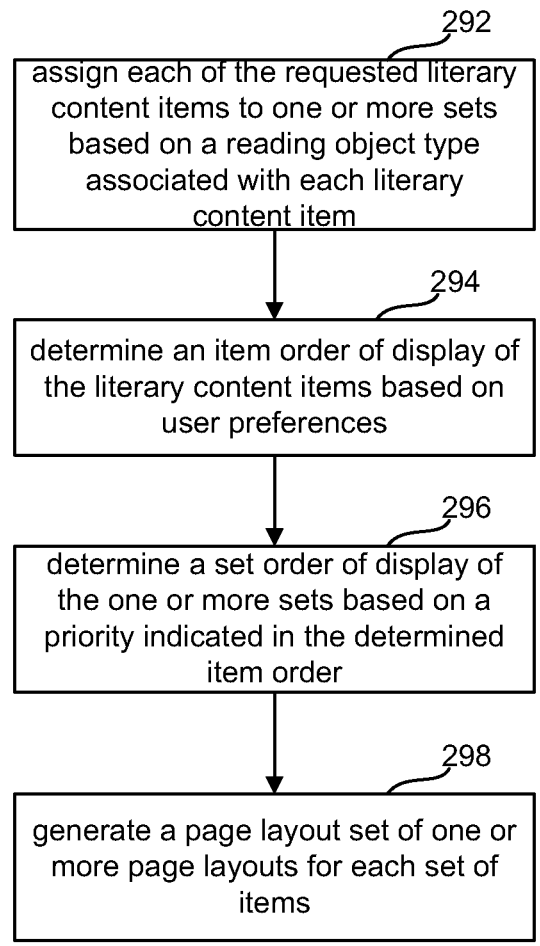
FIG. 7B is a flowchart of an example of an implementation process of generating one or more page layouts including the one or more literary content items based on stored layout rules.

FIG. 7B is a flowchart of an example of an implementation process of generating one or more page layouts including the one or more literary content items based on stored layout rules. In this implementation example, literary content items with metadata 201 indicating a same or compatible reading object type are grouped in a same set. Which set of literary content items displayed first is dependent on a display order of the literary content items determined based on user preferences. In step 292, the virtual printed content application 202 assigns each of the requested literary content items to one or more sets based on a reading object type associated with each literary content item, and in step 294 determines an item order of display of the literary content items based on user preferences. In step 296 the virtual printed content application 202 determines a set order of display of the one or more sets based on a priority indicated in the determined item order. In step 298, the virtual printed content application 202 generates a page layout set of one or more page layouts for each set of literary content items.

As an illustrative example, a user may identify a number of news articles from different sources, a chapter in a textbook and a mystery novel to read for a long train ride. For this example, the user picks up a newspaper left on the seat next to her and uses it as a real reading object. People tend to read newspaper articles together, and so the newspaper articles are placed in one set so that they will be laid out together in a typical newspaper layout template. The page layout for the set of newspaper articles will have newspaper page layouts for a front, perhaps a back and interior pages based on a selected newspaper template. An example of a newspaper template is one with lines separating columns of fixed width, and another example is one without lines separating the columns and variable column size. The actual print layout on the newspaper picked up does not effect the layout as an opaque background for the literary items will be displayed. The textbook will have a different page layout due to the size of its pages, and the textbook pages form another set. Typically, a person does not read interspersed pages of a textbook and a mystery. The real newspaper is still used at the reading object in this example, although the newspaper block template is no longer used. The textbook is displayed in a page format, and based on its page size and the size dimensions of the picked up newspaper, as may be determined as described previously by identifying the title of the periodical, more than one page of the textbook may be designated for display registered to the newspaper page. Similarly, the mystery novel may be displayed like the textbook, although the page size in the print layout characteristics for the novel may be smaller allowing more pages to fit on the newspaper page.

In the same example, but using a virtual reading object, one virtual reading object may be selected, and based on a layout rule that the reading object type for the highest percentage of requested content is selected, a book format may be selected for the reading object. In another example, due to the freedom allowed by a virtual book, a book for the textbook and novel or a book for each of them fitted to the size characteristics of their respective print layout characteristics may have been generated. A separate newspaper object may have been generated for the articles.

Figure 7C:
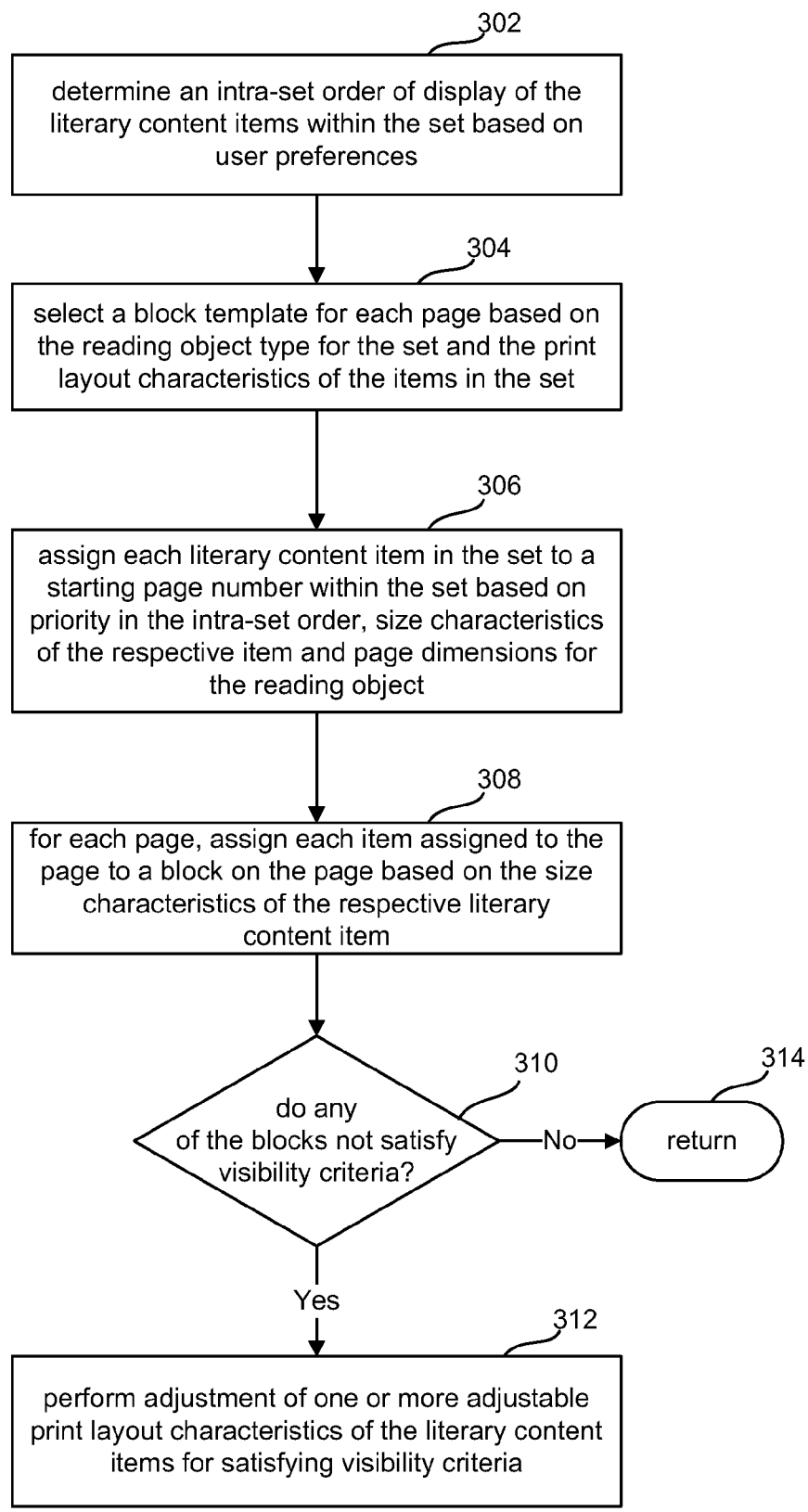
FIG. 7C is a flowchart of an example of an implementation of a process for generating one or more page layouts for a set of literary content items for the process of FIG. 7B.

FIG. 7C is a flowchart of an example of an implementation of a process for generating one or more page layouts for a set of literary content items for the process of FIG. 7B. The virtual printed content application 202 in step 302 determines an intra-set order of display of the literary content items within the set based on user preferences. For example, the user's reading history or actual user input has indicated that financial news is of highest priority and articles from a leading financial newspaper have the highest priority followed by a financial articles from a leading general newspaper with a national following. In step 304, the virtual printed content application 202 selects a block template for each page based on the reading object type for the set and the print layout characteristics of the items in the set, and in step 306 assigns each literary content item in the set to a starting page number within the set based on priority in the intra-set order, size characteristics of the respective item and page dimensions for the reading object.

In step 308, for each page, assign each item assigned to the page to a block on the page based on the size characteristics of the respective literary content item. For example, based on the number of words of the item, and the font used, an area of the item can be determined to see if the item satisfies fit criteria for the block dimensions. Layout rules typically will allow the virtual printed content application 202 to increase or decrease the amount of the literary content, subject to any minimum content percentage criteria, in a block and adjust font size within a range. The virtual printed content application 202 can split a literary content item between blocks on the same or separate page.

In step 310, the virtual printed content application 202 determines whether any of the blocks do not satisfy visibility criteria. Responsive to a block not satisfying visibility criteria, the virtual printed content application 202 in step 312 performs adjustment of one or more adjustable print layout characteristics of the literary content item for satisfying visibility criteria. Again, not being limited to a specific number of pages allows flexibility in making layout adjustments as a page can be added as needed. Responsive to the blocks satisfying visibility criteria, the virtual printed content application 202 returns control in step 314 to another aspect of the virtual printed content application 202 or another application executing in the display device system 8 until another literary content item is requested to be displayed.

Figure 8:
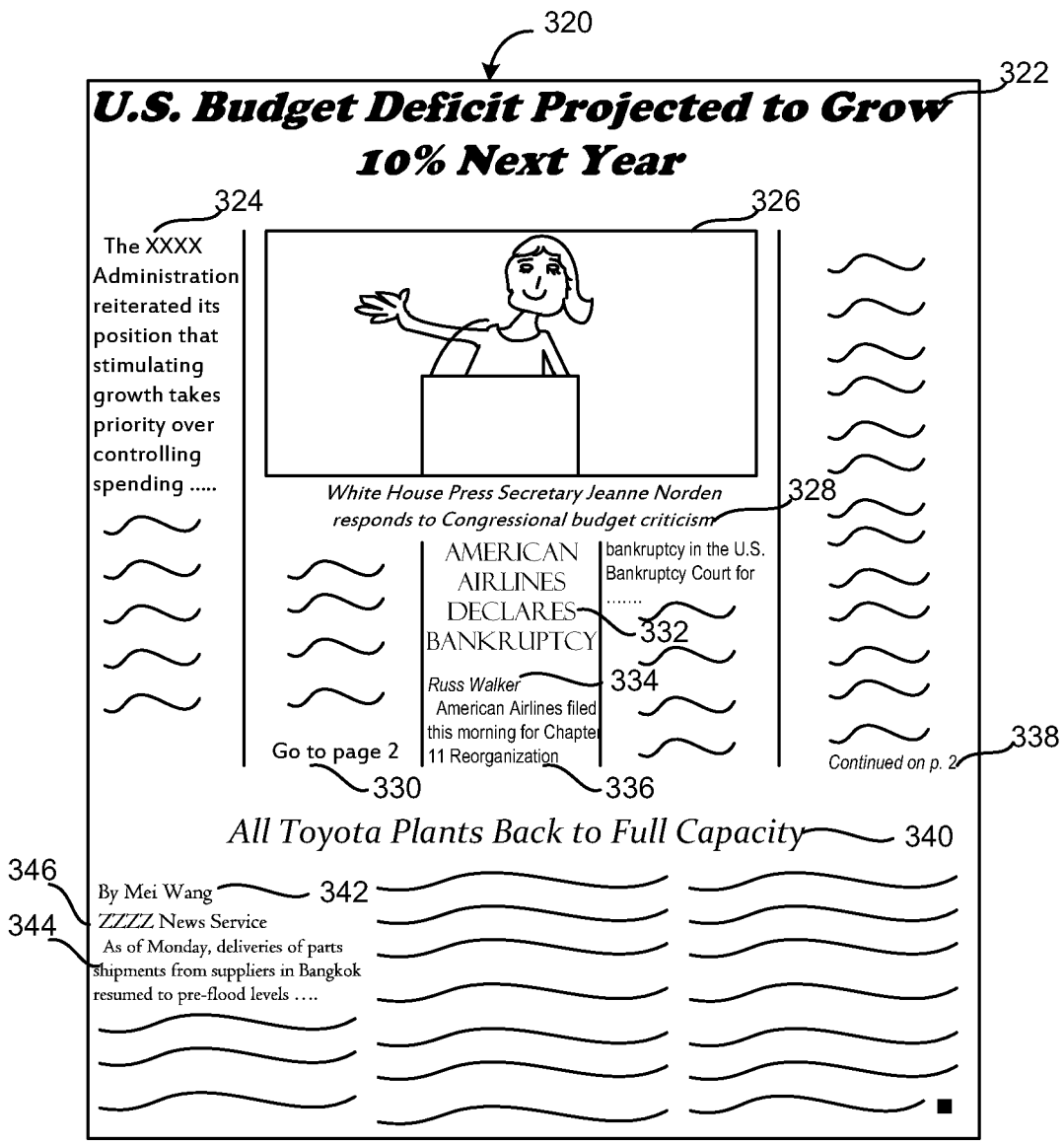
FIG. 8 is an example of a page displayed in the field of view with a page layout including literary content items with publisher and assigned print layout characteristics.

FIG. 8 is an example of a page displayed in the field of view with a page layout including literary content items with publisher and assigned print layout characteristics. FIG. 8 illustrates an example of displayed literary content of news articles selected by the virtual printed content application 202 based on a user's preferences for financial news. A newspaper front page 320 is displayed either registered to a real reading object or a virtual reading object. The newspaper articles include two articles 324 and 336 with different publisher layout characteristics and a third article 344 which was assigned print layout characteristics as stored print layout characteristics were not made accessible by the publisher.

In this example, the template of a newspaper is chosen based on a reading object type of newspaper being associated with the articles, even for the syndicated news service article 344. The article 324 with the highest user preference for the page (e.g. based on reading history in user profile data or by a first entry of user input requesting literary content for display), and in this case, the set as this is the front page, has a photograph 326 associated with it. The print layout characteristics for the newspaper from which the article came center a photograph on the front page as indicated in layout rules 206 stored by the publisher. This front page was generated from a template which included a headline block, a center photograph block, two blocks surrounding or outlining the center photograph block and a third article block.

The virtual printed content application 202 selects the title of the article 324 with the highest user preference for the set as the headline in accordance with the print layout characteristics identified for the article if placed in a lead article block and the publisher's layout rules. In this example, the headline 322 reads "U.S. Budget Deficit Projected to Grow 10% Next Year." The font and font style characteristics (e.g. bold, italic, regular, etc.) and spacing and other layout characteristics of the title are selected as those stored in the publisher's layout rules or the print characteristics for the article 324. This example uses Cooper Black at an 18 pt. size in italics.

For the article 324, its print layout characteristics identify its linked photograph 326 and linked photo caption 328 "White House Press Secretary Jeanne Norden Responds to Congressional Budget Criticism" and print layout characteristics which apply to them such as the font, font style, font size and line spacing range of the photo caption 328. Print layout characteristics for article 324 indicate a font, font style and font size range for the article text itself which is regular style 10 pt. Estrangelo Edessa in this example while that of the photo caption 328 uses a 9 pt. italicized version of the same font.

In some embodiments, publisher print layout rules for the article identify an advertisement to be displayed as a print advertisement responsive to the article being displayed. For example, the advertisement may be displayed on an opposite page to the article.

The columns for article 324 are of fixed size and narrower than those for article 336. For a newspaper as articles typically run onto other pages, the page connector 330 format as specified in the print layout characteristics for the article or the publisher's layout rules is used which includes the text "Go to page 2." This page connector 330 style of using the word "Go" capitalized and spelling out the word "page" represents a layout characteristic forming part of a source attribute identifying the publisher as do the font characteristics and the column characteristics. An author byline is not included on the front page as the print layout characteristics for the article include the byline at the end of the article.

The print layout characteristics for the article 336 from a well-known financial newspaper are different. As it is not the lead article, the title for the article takes the font, size and spacing characteristics of a non-lead article for the newspaper from which this article comes. The position of the title as indicated by the print layout characteristics is within the column width of the article to which it is attached as illustrated for title 332 which reads "AMERICAN AIRLINES DECLARES BANKRUPTCY." In this example, the print layout characteristics indicate the title font is Felix Titling in 10 pt. font size, and the letters of the title are all capitalized. The byline style includes the byline 334 of the author's name in italics by itself in Ariel Narrow at a same font size as the article. The page connector 338 is printed in italics and uses a form with the word "Continued" in Italics and the abbreviation "p." for page as in "Continued on p. 2". The column characteristics result in display of slightly wider columns than article 324.

The third article is from a syndicated news service like the Associated Press so there are no print layout characteristics associated with it; however, there may be a few publisher layout rules such as inclusion of the author name in a byline 342 which uses the word "By" capitalized and the name of the news service, in this example a representative "ZZZZ News Service" 346. The virtual printed content application 202 selects the fonts, font sizes and in this example chooses a default variable width column format for the block in order to fit the short article in its entirety. A default title format which extends across the page is chosen as well as a font, Constantia in 14 pt. font in this example for the title 340 which reads "All Toyota Plants Back to Full Capacity." A default newspaper font is selected for the text of the article 344 represented here by Arial font.

Besides publisher layout rules 206, general layout rules 206 for a reading object may also be implemented by virtual printed content application 202. Some examples of such rules are that each word in a title is capitalized and an article title has a smaller font size than a headline.

Figure 9A:
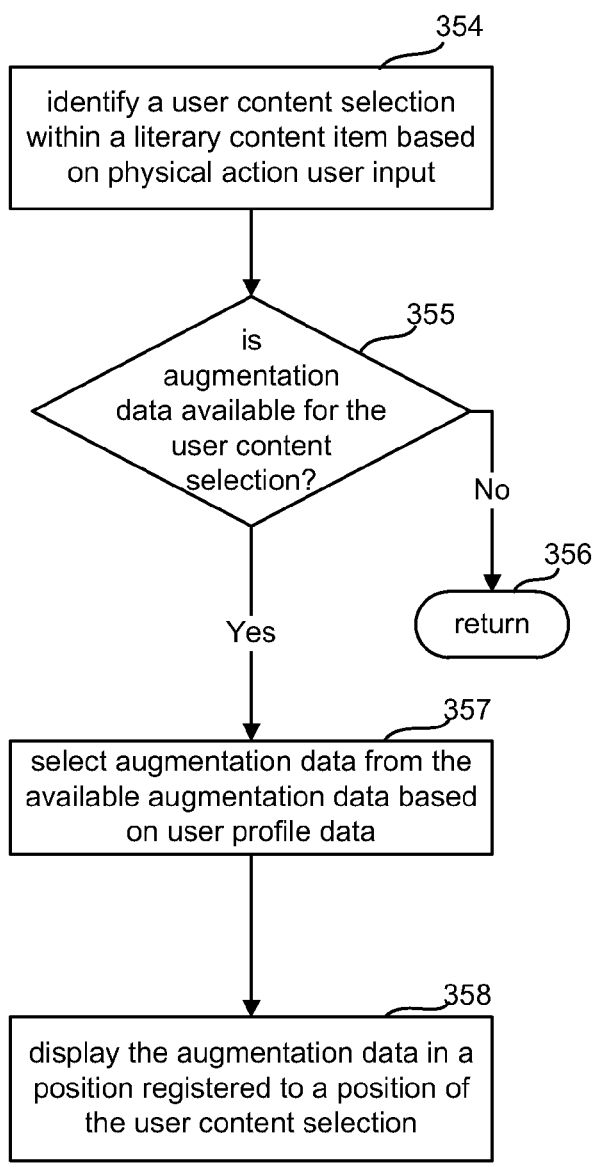
FIG. 9A is a flowchart of an embodiment of a method for displaying virtual augmentation data registered to at least one of the one or more literary content items responsive to physical action user input.

FIG. 9A is a flowchart of an embodiment of a method for displaying personalized virtual augmentation data registered to a user content selection within a literary content item based on physical action user input. In step 354, the virtual printed content application 202 identifies a user content selection within the literary content item based on physical action user input. In step 355, the virtual printed content application 202 determines whether virtual augmentation data is available for the user content selection, and if not returns control in step 356 to another aspect of the virtual printed content application 202 or another application executing in the display device system 8 until another user content selection is identified.

If there is augmentation data available for the user content selection, then in step 357, the application 202 selects augmentation data from the available augmentation data based on user profile data, and causes display in step 358 of the augmentation data in a position registered to a position of the user content selection.

Figure 9B:
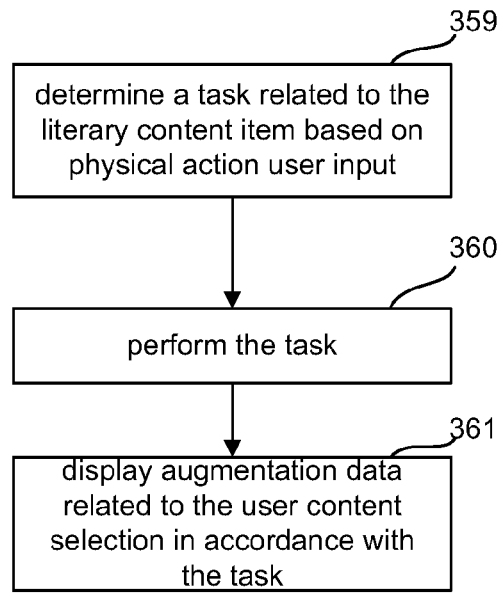
FIG. 9B is a flowchart of another embodiment of a method for displaying virtual augmentation data registered to at least one of the one or more literary content items responsive to physical action user input.

FIG. 9B is a flowchart of another embodiment of a method for displaying virtual augmentation data registered to at least one of the one or more literary content items responsive to physical action user input. In step 359, the virtual printed content application 202 determines a task related to the literary content item based on physical action user input, and in step 360, performs the task. Virtual augmentation data related to the literary content item is displayed in accordance with the task in step 361. In some examples, the augmentation data is personalized for the user based on user profile data. An example of such a task which personalizes augmentation data is described below which allows a user to substitute or fill-in a name of a character or a location. Some other examples of tasks are an interactive task which displays and updates interactive virtual content, e.g. games, responsive to user input, a Snippet® tool which allows a user to select content and send it to another user via a messaging application like email, instant messaging or Short Message Service (SMS), an annotation application, a language translation application, a search task, a definition application. Another example of a task described below is a page flipping task for a virtual book which also displays an indicator of augmentation data available for each page as it is flipping. The indicators of augmentation data can also be displayed in coordination of flipping pages of a real reading object. As mentioned above, a user can define tasks as well.

Figure 10A:
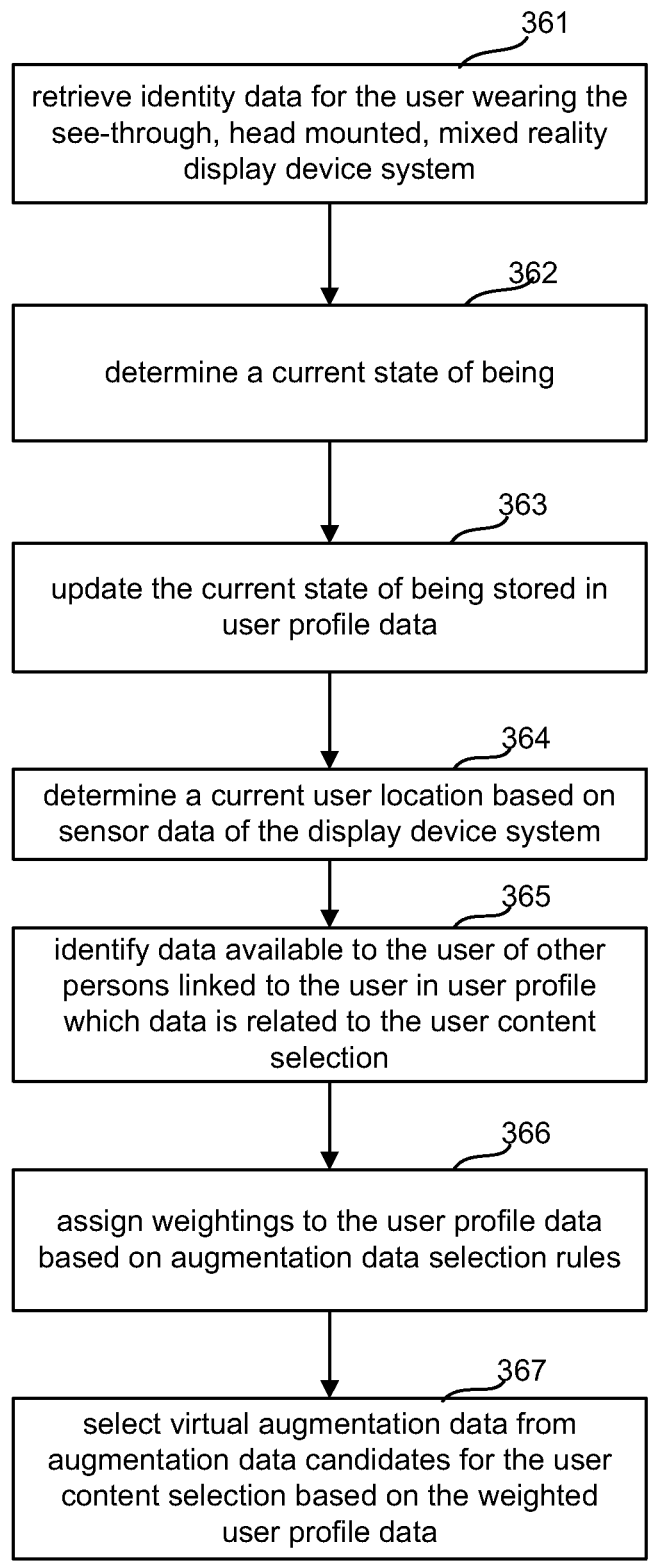
FIG. 10A is a flowchart of an implementation example of a process for selecting virtual augmentation data from available virtual augmentation data based on user profile data.

FIG. 10A is a flowchart of an implementation example of a process for selecting virtual augmentation data from available virtual augmentation data based on user profile data. In step 361, the virtual printed content application 202 retrieves identity data for the user wearing the see-through, head mounted, mixed reality display device system. Furthermore, the application 202 determines in step 362 a current state of being. Some examples of settings are state of being settings like sleepy, awake, sleeping, being late for an appointment, strong emotion, and may also include activities e.g. eating, driving, traveling on a train.

A state of being may be determined from data sensed of the user's body as well as information tracked from other applications and location data as well. For example, based on location data and a calendar application, a state of being application may indicate the user is early or late for a meeting. Image data of the user's eye from an eye tracking assembly, also referred to as eye data, may indicate the user is experiencing strong emotion while also being late. More than one state of being may apply.

Some examples of user physical characteristics which may be identified in eye data and linked with a state of being in the state of being rules 179 are blinking rate, pupil size and pupil size changes. In some embodiments, the see-through display device system 8 may also have a biometric sensor like a pulse rate measuring sensor which presses against a user temple. One example of a physical characteristic which can indicate a state of being is blinking beyond a certain level as detected from image data, glint data, or sensors 128. Such blinking may indicate strong emotion. More simply, a detected closed eyelid for a period of time can indicate a state of being as "sleeping." A tearful state of the eye can also be detected from its reflectivity to indicate crying.

Pupil size and the pupil size stability may indicate a state of being sleepy or tired. Pupil size changes with lighting changes. If the pupil is treated as an ellipse, if the lighting does not change, one axis of the ellipse, the major axis, remains constant as it represents the diameter of the pupil. The width of the minor axis of the ellipse changes with gaze changes. The light meters (not shown) of the front facing cameras 113 can detect lighting changes. Therefore pupil dilation due to factors other than lighting changes can also be determined. Sleepiness and sleep deprivation may cause the pupil's overall size to shrink if tired, and the pupil size to become less stable, fluctuating in size. Pupil dilation beyond a criteria under steady state lighting conditions may also indicate a reaction to an emotional stimuli. However, pupil dilation may also be associated with activity.

Therefore, software such as a client push service application $204_1$ discussed below may correlate the pupil dilation with at least a state of being data setting of "strong emotion" if from image data from the outward or physical environment facing cameras 113 and small head movement indicated by the motion sensors 132 indicate the user is not exercising, for example, the user appears to be sitting down in his or her office. The object being viewed as indicated by the image data from the outward facing cameras 113 may provide more data, e.g. a young child looking at a picture of a real dinosaur skeleton or the literary content item has been identified as a particular scary novel, and based on time of day, location data and field of view data over time, the reader is home alone at night. In another example, the image data indicated a view of one of the user's typical lunchtime running paths and the motion sensors 132 indicated a running or jogging speed within a time period, e.g. two minutes, before a newspaper has been identified by the virtual printed content application 202 in image data of the field of view. In this example, the state of being data settings may include "awake" and "neutral emotion" and may include "exercising" and "running" as activity data settings depending on time periods from stopping for identifying an end of an activity.

In one embodiment, either version, client or server, of the push application may include software for determining the state of being. The software may implement one or more heuristic algorithms based on the state of being rules 179 to determine a state of being of the user based on both the eye data and image and audio data of the user's surroundings. The client push service application $204_1$ updates the current state of being data stored in user profile data $197_1$, 197 in step 366.

A current user location based on sensor data of the display device system is determined in step 364. For example, the current user location can be identified by GPS data, image data of locations, and even IP addresses of network access points associated with particular locations. In step 365, the virtual printed content application 202 identifies data available to the user of other persons linked to the user in user profile which data is related to the user content selection. For example, if a literary content item is a scientific journal with an article by authors, and one of the user's social networking friends commented on the article on his social networking site page, the friend's comment would be identified.

In this embodiment, the virtual printed content application 202 in step 366, assigns weightings to the user profile data based on augmentation data selection rules 298. In some examples, the augmentation selection rules may prioritize items from user profile data. For example, the following categories of user profile items may be prioritized in order starting from highest as identity data, state of being data, location data, the current or most recent user content selection, the literary content item being viewed, and other users data related to the selection or item. In step 367, the virtual printed content application 202 selects virtual augmentation data from virtual augmentation data candidates for the user content selection based on the weighted user profile data. For example, identity data may include languages known by the user. If the user only knows English, virtual augmentation data with English text has a higher probability of being selected than Spanish language augmentation data. Also, as per the example below, for a five year old coloring in a coloring book, pictorial augmentation data may be selected whereas simple text augmentation data may be displayed for a seven year old.

Figure 10B:
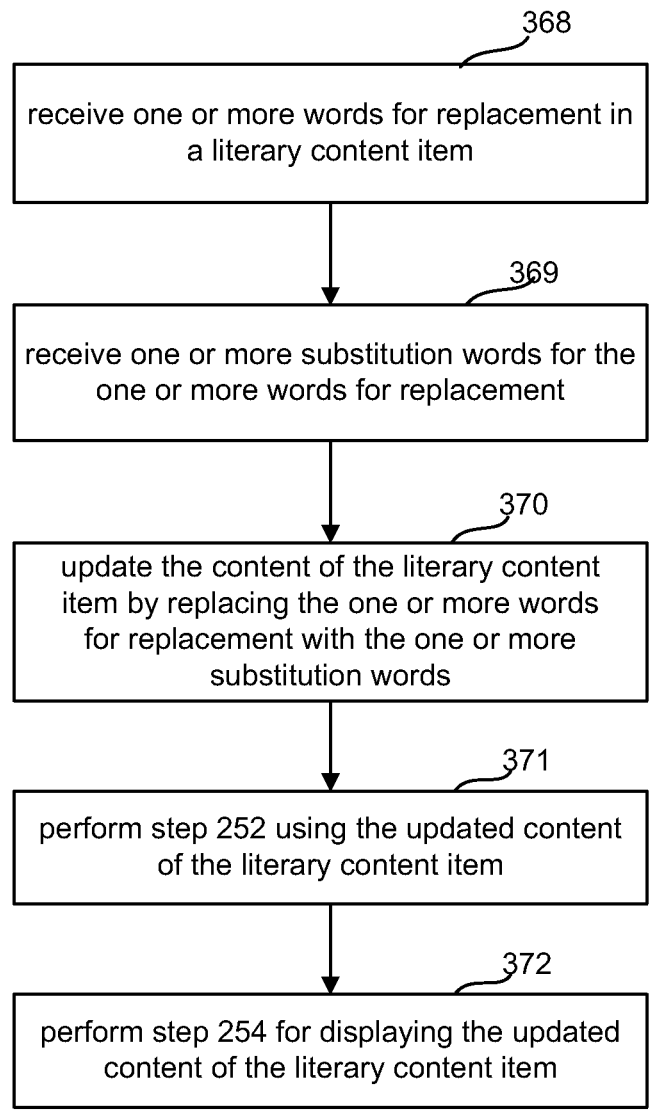
FIG. 10B is a flowchart of an embodiment of a method for performing a task which allows the user to replace at least one word with one or more other words in a literary content item.

FIG. 10B is a flowchart of an embodiment of a method for performing a task which allows the user to replace at least one word with one or more other words in a literary content item. In step 368, the virtual printed content application 202 receives one or more words for replacement in a literary content item, and in step 369 receives one or more substitution words for the one or more words for replacement. The content of the literary content item is updated in step 370 by replacing the one or more words for replacement with the one or more substitution words. In step 371, the virtual printed content application 202 performs step 312 using the updated content of the literary content item, and in step 372 performs step 314 for displaying the updated content of the literary content item.

Figure 11A:
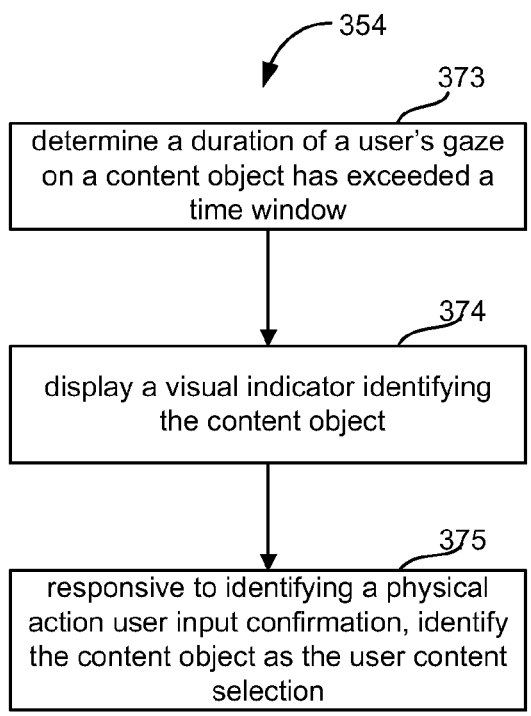
FIG. 11A is a flowchart of an implementation example of a process for identifying at least one physical action of a user's eye selecting a user content selection.

FIG. 11A is a flowchart of an implementation example of a process for identifying at least one physical action of a user's eye selecting a user content selection. The eye tracking software 196 identifies a position of the eye in the socket typically based on pupil position, but iris position may also be a basis. In step 370, the virtual printed content application 202 determines whether a duration of a user's gaze on a content object has exceeded a time window and, in step 371, causes the image generation units 120 to display a visual indicator identifying the content object. In step 372, responsive to identifying a physical action user input confirmation, the virtual printed content application 202 identifies the content object as the user content selection. Some examples of a physical action user input confirmation are an action like a blink, gesture or voice command indicating "yes" or "select" or a request for a task. The user may indicate other than a confirmation by a physical action on the visual indicator, e.g. an outline, like reshaping it to include more or less content, or a gesture, blink or voice command indicating "no" or "cancel."

Figure 11B:
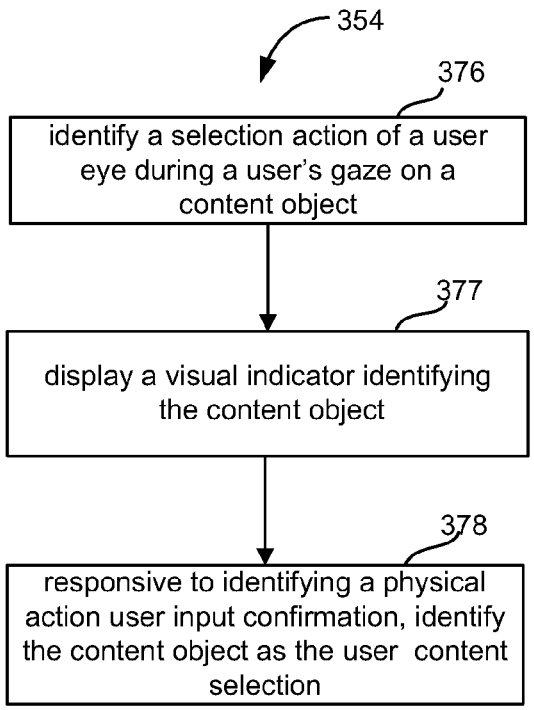
FIG. 11B is a flowchart of another implementation example of a process for identifying at least one physical action of a user's eye selecting a user content selection.

FIG. 11B is a flowchart of another implementation example of a process for identifying at least one physical action of a user's eye selecting a user content selection. In step 373, the virtual printed content application 202 identifies a selection action of a user eye during a user's gaze on a content object, and in step 374, causes the image generation units 120 to display a visual indicator identifying the content object. In step 375, responsive to identifying a physical action user input confirmation, the virtual printed content application 202 identifies the content object as the user content selection.

Figure 11C:
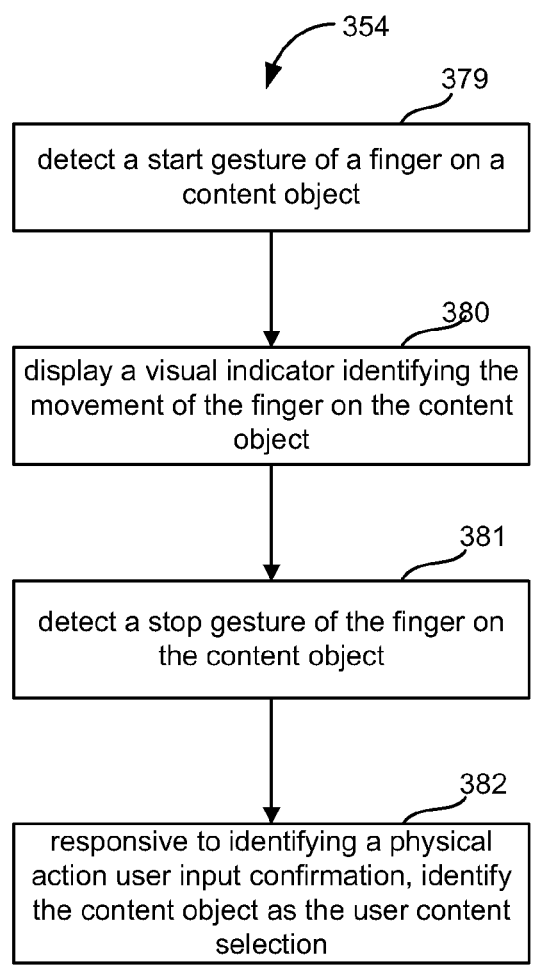
FIG. 11C is a flowchart of an implementation example of a process for identifying at least one physical action of a gesture selecting a user content selection.

FIG. 11C is a flowchart of an embodiment of an implementation example of a process for identifying at least one physical action of a gesture selecting a user content selection. In step 376, the virtual printed content application 202 receives notification that a start gesture of a finger on a section, e.g. a page of a reading object, virtual or real, corresponding to a position of a displayed content object has been detected, and in step 377 causes the image generation units 120 to display a visual indicator identifying the movement of the finger on the section of the reading object. In step 378, the virtual printed content application 202 receives notification that a stop gesture of the finger on the content object has been detected. As fingers are typically on some portion of a page or sheet or card a user is reading, the start and stop gestures make a clear distinction of when a user is making a request as opposed to simply moving finger positions. Other process examples may not require a start and stop gesture and instead distinguish movements from gestures based on monitoring user finger behavior over time. In step 379, responsive to identifying a physical action user input confirmation, the virtual printed content application 202 identifies the content object as the user content selection.

Figure 12:
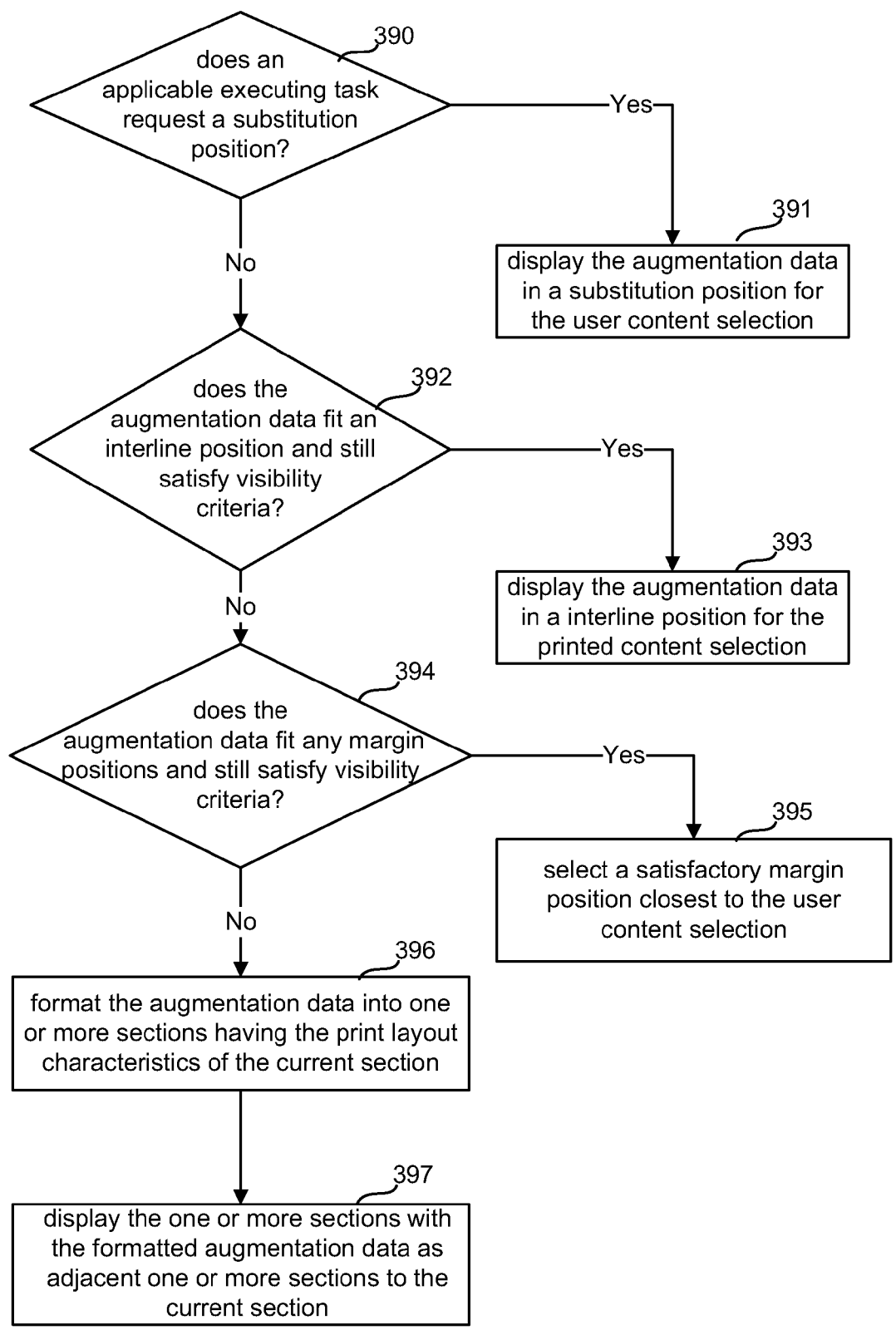
FIG. 12 is a flowchart of an implementation example of a process for determining placement of virtual augmentation data with respect to a page of a reading object.

FIG. 12 is a flowchart of an implementation example of a process for determining placement of virtual augmentation data with respect to a page of a reading object. In this example, the virtual printed content application 202 has a number of predetermined position options in relation to the user content selection from which to select. A user can move the augmentation data as he or she prefers from the predetermined positions. In this example, in step 390, the virtual printed content application 202 determines whether an applicable executing task requests a substitution position. For example, a task may be a personalization task with a sub-task of changing or inserting character names to those of the reader and one or more user designated people. If substitution intended, the virtual printed content application 202 displays the virtual augmentation data in a substitution position for the user content selection in step 391. In step 392, responsive to an executing task not requesting a substitution position, the virtual printed content application 202 determines whether the virtual augmentation data fits an interline position and still satisfies visibility criteria. An interline position is a space between lines of text, or between a line of text and a picture, or a space between pictures. An example of visibility criteria is whether the size of the augmentation data to fit into the interline position would be too small for a human with average eyesight to read at a comfortable reading position. Whether the virtual augmentation data fits an interline position can be determined based on what percentage of the content can be displayed at an interline position and still be visible. A synonym as a definition is an example of content which may fit an interline position and still satisfy visibility criteria. An interline position is typically not suitable for a picture. If an interline position is suitable, the virtual printed content application 202 displays the augmentation data in an interline position for the user content selection in step 393.

If the interline position is not suitable, in step 394, the virtual printed content application 202 determines whether the augmentation data fits any margin positions and still satisfies visibility criteria. If one or more satisfactory margin positions are available, the virtual printed content application 202 selects a satisfactory margin position closest to the user content selection in step 395. If a satisfactory margin position is not available, the virtual printed content application 202 formats the augmentation data into one or more sections having the layout characteristics of the current section in step 396 and in step 397, displays the one or more sections with the formatted virtual augmentation data after the current section in the layout of the reading object. An example of a current section is a page. Layout characteristics for a page as a section include typical page layout settings. Some examples of such settings are margins, page number placement, interline spacing, spacing around pictures, font and font size. Some examples of the layout of the reading object may be a newspaper, a book, a magazine, or a greeting card. In the example of a reading object as a book, the one or more sections formatted with the virtual augmentation data may be made to appear as additional pages of the book.

In the example of FIG. 12, the virtual augmentation data is formatted to appear within the perimeter of the reading object. In other examples, a floating position may also be a position option. For example, a margin space may appear to be extended to include a picture linked to a content selection for which annotations already take up the nearest margin space. In another example, a floating explanatory paragraph may appear to pop up perpendicularly out of the page in an interline space near a concept it explains.

FIG. 13A is a flowchart of an embodiment of a method for augmenting a user selection within a virtual copy of a literary content item with virtual augmentation data and saving the virtual augmentation data for retrieval for any other copy of the literary content item. The virtual printed content application 202 in step 398 displays the augmentation data at a position registered to a user content selection. An example of such augmentation data can be user generated augmentation data like annotation data or a commentary on the selection. In step 400, the augmentation data is stored and linked with the user content selection in a medium independent data version, e.g. a work or work version, of the literary content item. By storing augmentation data with a medium independent version, the user can recall the augmentation data regardless of the particular copy of the literary content item she is viewing. Optionally, in step 401, the augmentation data can be linked with the user content selection in a print version of the literary content item represented by the printed content item version identifier identified for the literary content item.

FIG. 13B is a flowchart of an embodiment of a method for displaying stored augmentation data entered for the user selection within the virtual copy of the literary content item for another copy of the literary content item having different layout characteristics. In step 402, the virtual printed content application 202 identifies a different layout version of the literary content item in the field of view of the see-through, mixed reality display device. The different layout version may be for a print version or for another virtual version. The position data of the printed content items, the work versions and the literary works can also be cross-referenced in the databases 211, 213 and 215 by a publisher, university, library or other entity maintaining Internet indexed resources. In step 404, the virtual printed content application 202 identifies the same user content selection within the different layout version based on physical action user input and in step 406 retrieves the augmentation data linked to same user content selection in the medium independent version of the literary content item. In step 408, the virtual printed content application 202 displays the retrieved augmentation data at a position registered to the user content selection in the different layout version of the literary content item.

Besides displaying virtual data of a literary content item to appear as printed content, some tasks can help a user navigate a virtual book like navigating a real book. An example of such a task is a page flipping task. FIGS. 14A through 14D illustrate two examples of different gesture actions which mimic natural human motion in flipping pages which provide a more realistic experience for the user.

Figure 14A:
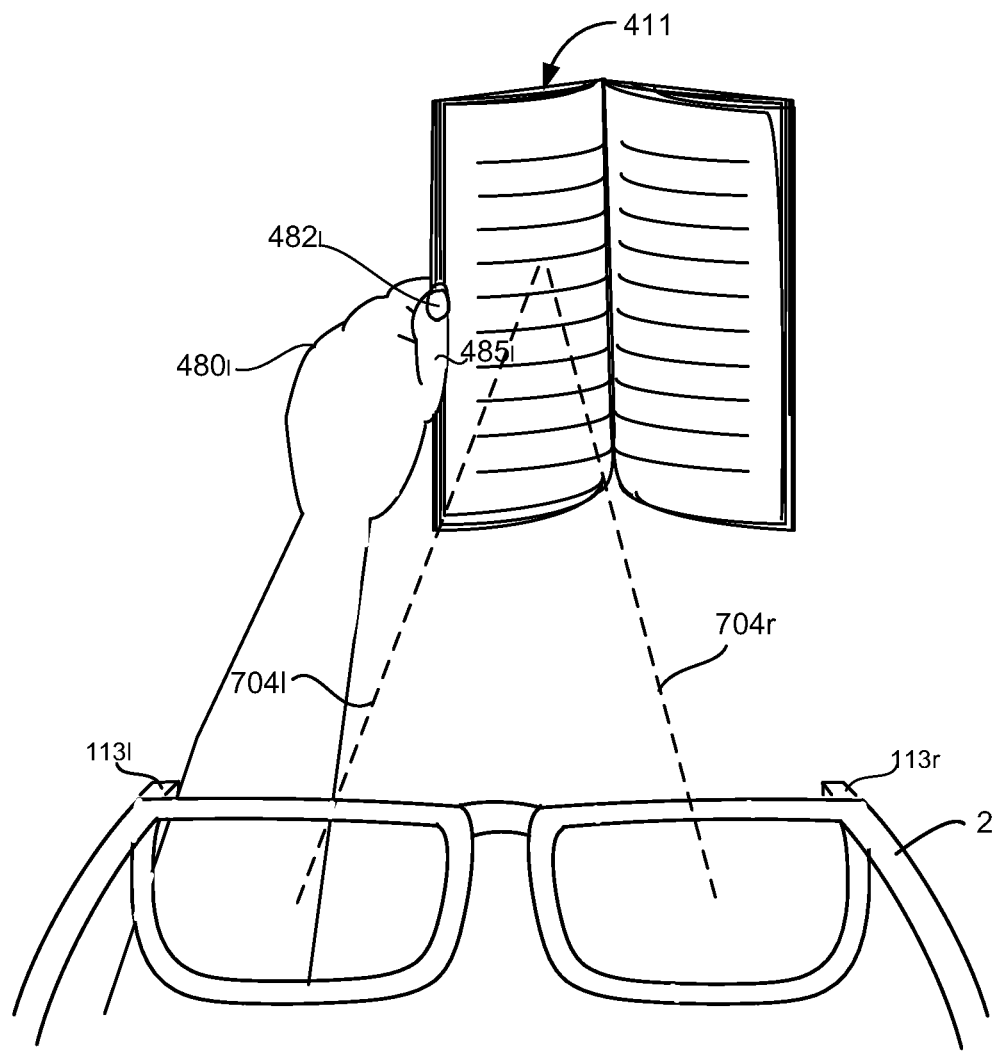
FIG. 14A illustrates an example of a starting position of a thumb for a page flipping gesture.

FIG. 14A illustrates an example of a starting position of a thumb for a first example of a page flipping gesture in which a user uses the length of the thumb in a flipping motion. Reading object 411 illustrated as a book for this example but the page flipping task can also apply to other types of virtual reading objects. Left handing flipping is illustrated but either hand can perform a flipping gesture. Also illustrated is a display device 2 with front facing cameras 113l and 113r for capturing user finger and hand gestures. Gestures performed by other body parts such as wrists, forearms and even feet, elbows and the like can also be used to control applications like virtual printed content application 202. Hand and finger gestures allow the user to maintain reading material in the field of view of the display simultaneously with performing a gesture. Lines 704l and 704r represent eye lines of sight approximating gaze vectors from a user's pupils or retinas. For the examples below, the virtual printed content application 202 may electronically provide instructions to the user for performing certain thumb actions in a training session during which image data of the user's thumb from different angles is captured and the user's skin color is identified. This training data as well as image data of the user's thumbs captured over time of using the display device 2 may form a basis for a gesture recognition filter which the virtual application 202 can format and send to the gesture recognition engine 193 through an interface like an application programming interface (API).

From image data captured by the front facing cameras 113, the gesture recognition engine 193 identifies a starting thumb position in which the thumbnail 4821 is approximately parallel or flush with the edges of the left side of the pages so that image data shows the front of the thumbnail. A gesture filter defines the gesture for the left thumb to rotate left so that the thumbnail is detected rotating to the left in image data. The image data shows an approximate front view of the thumbnail rotating to a right side view of the thumbnail 4821 and the thumb 4851 as a whole. The flesh portion of the thumb behind the nail becomes more visible in image data as it rotates to its left and is recognized based on its color and pattern matching.

The front facing cameras 113 capture data at a rate faster than the thumb moves, for example in a range between 30 or 60 frames a second. The gesture recognition engine 193 identifies for the virtual printed content application 202 the speed and acceleration at which the width of the right side thumb is changing. This allows the virtual printed content application 202 to flip the pages at the rate of speed of the user's flipping and speed up the flipping or slow down the flipping based on how fast the width is changing.

Figure 14B:
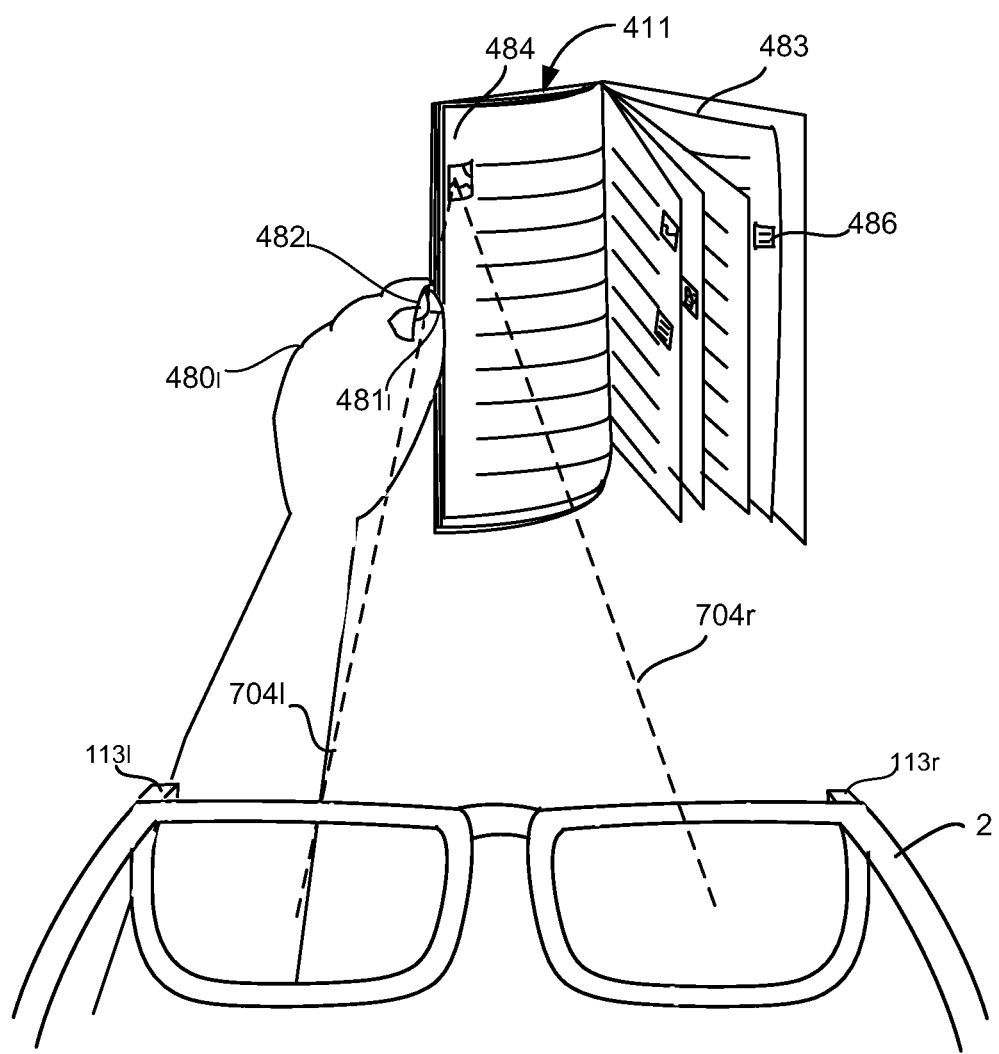
FIG. 14B illustrates an example of flipped pages including thumbnails of virtual augmentation data on the pages and an example of an ending position of the thumb.

FIG. 14B illustrates an example of flipped pages including thumbnails of virtual augmentation data on the pages and an example of an ending position of the thumb. A thumbnail is an illustrative example of an indicator of augmentation data being available for display registered to the at least one page image As a guideline for a flip stopping gesture and to identify upon which page to stop, the width of the right side of the thumb is measured in the image data, and if a width criteria, as indicated by line 4811, is satisfied, the flipping stops at a certain page 484 as indicated. Additionally, virtual augmentation data can be indicated to be on a page as it flips by. In this example, a thumbnail 486 representing the augmentation data is displayed in a page margin of a representative flipping page 483. One of the flipping pages and one of the thumbnails is labeled to avoid overcrowding the drawing. The user's gaze upon the thumbnail can activate display of the augmentation data the thumbnail represents.

Figure 14C:
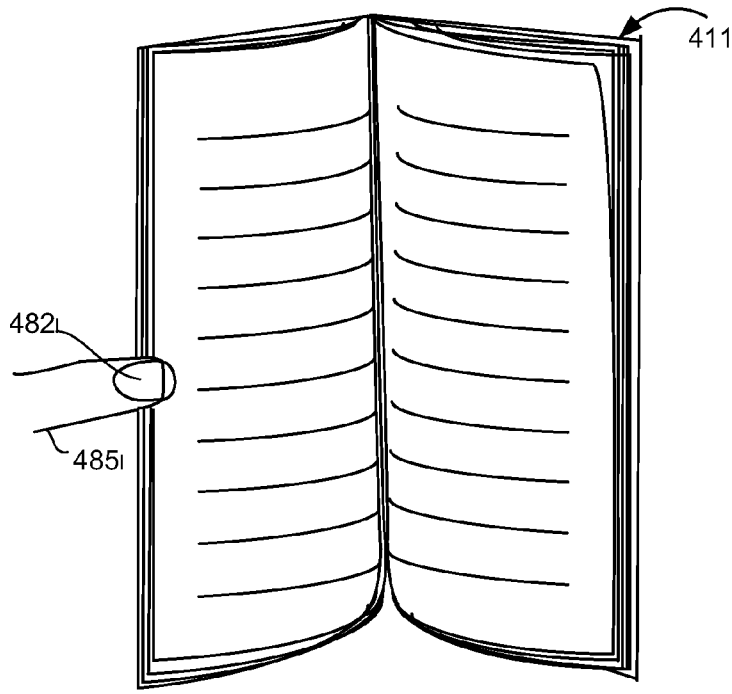
FIG. 14C illustrates an example of another starting position of a thumb for a page flipping gesture.

FIG. 14C illustrates an example of another starting position of a thumb for a page flipping gesture. From image data captured by the front facing cameras 113, the gesture recognition engine 193 identifies another starting thumb position in which the front of the thumbnail 4821 is substantially in view, and the thumbnail is approximately parallel or flush with the edges of the left side of the pages so that image data shows substantially the front of the thumbnail.

Figure 14D:
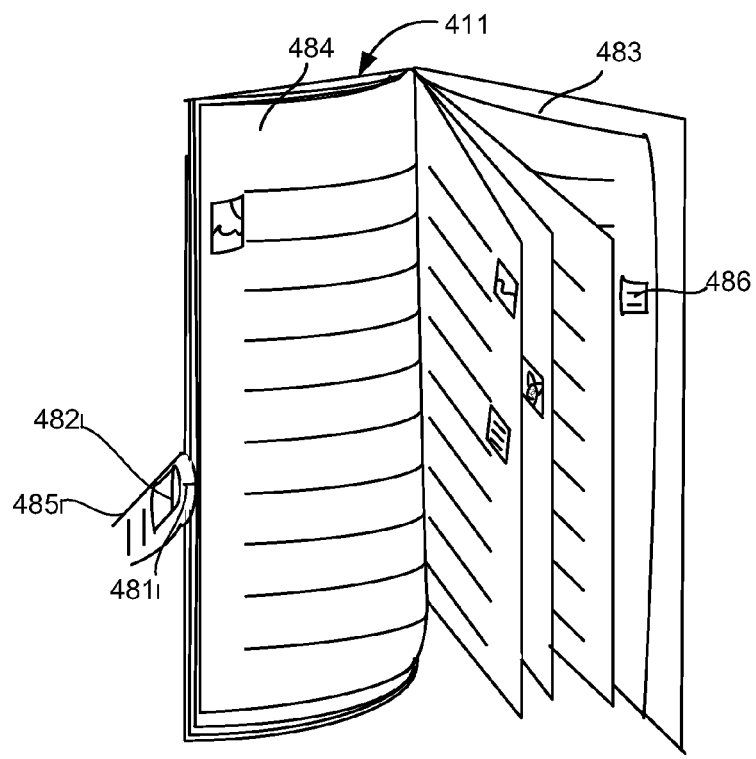
FIG. 14D illustrates another example of flipped pages including thumbnails of virtual augmentation data on the pages and another example of an ending position of the thumb.

FIG. 14D illustrates another example of an ending position of the thumb for a page flipping gesture. In this example, as a guideline for a flip stopping gesture and to identify upon which page to stop, the width of the top side of the thumb is measured in the image data, and if a width criteria, as indicated by line 4811, is satisfied, the flipping stops at a certain page 484 as indicated. Speed and acceleration of page flipping can also be determined by the virtual printed content application 202 in this example by measuring the width in image data and how fast the width is changing.

Figure 16:
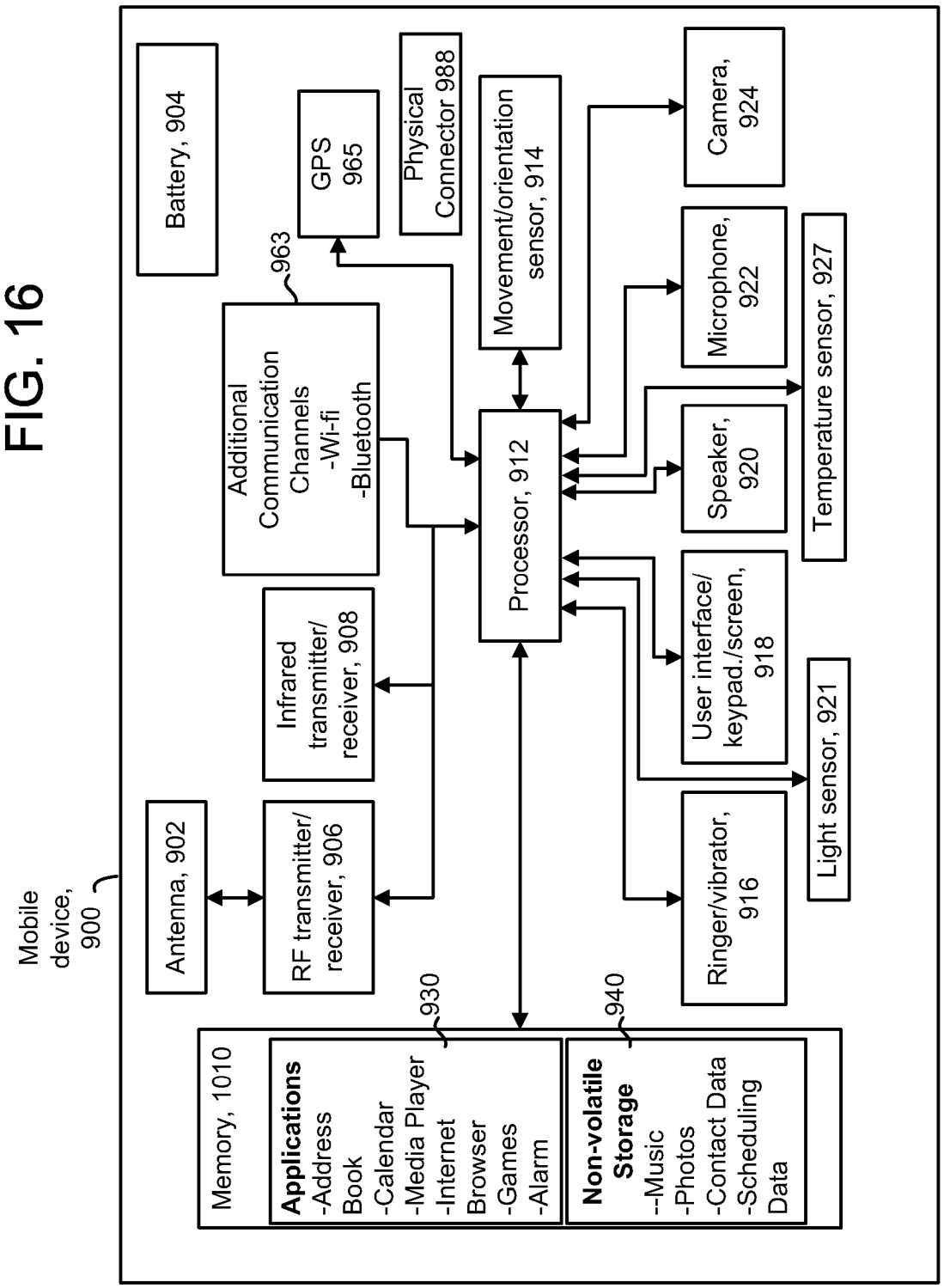
FIG. 16 is a block diagram of an exemplary mobile device which may operate in embodiments of the technology.

FIG. 15 is a block diagram of one embodiment of a computing system that can be used to implement one or more network accessible computing systems 12 which may host at least some of the software components of computing environment 54 or other elements depicted in FIG. 3. With reference to FIG. 16, an exemplary system for implementing the invention includes a computing device, such as computing device 800. In its most basic configuration, computing device 800 typically includes one or more processing units 802 and may include different types of processors as well such as central processing units (CPU) and graphics processing units (GPU). Computing device 800 also includes memory 804. Depending on the exact configuration and type of computing device, memory 804 may include volatile memory 805 (such as RAM), non-volatile memory 807 (such as ROM, flash memory, etc.) or some combination of the two. This most basic configuration is illustrated in FIG. 16 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 15 by removable storage 808 and non-removable storage 810.

Device 800 may also contain communications connection(s) 812 such as one or more network interfaces and transceivers that allow the device to communicate with other devices. Device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

As discussed above, the processing unit 4 may be embodied in a mobile device 5. FIG. 16 is a block diagram of an exemplary mobile device 900 which may operate in embodiments of the technology. Exemplary electronic circuitry of a typical mobile phone is depicted. The phone 900 includes one or more microprocessors 912, and memory 910 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 930 can be any assortment of programs, such as a camera application for photos and/or videos, an address book, a calendar application, a media player, an internet browser, games, other multimedia applications, an alarm application, other third party applications like a skin application and image processing software for processing image data to and from the display device 2 discussed herein, and the like. The non-volatile storage component 940 in memory 910 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 960 like Wi-Fi, WUSB, RFID, infrared or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 920, a microphone 922, a camera 924, a light sensor 921 and a temperature sensor 927.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures include examples of computer readable storage devices. Computer readable storage devices are also processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying virtual data having an appearance of printed content using a near eye, mixed reality display device system comprising:
   receiving a request by the near eye, mixed reality display device system to display one or more literary content items having the appearance of printed content on a reading object in a field of view of a near-eye display of the near-eye, mixed reality display device system;
   determining by a processor of the near-eye, mixed reality display device system whether user input has been detected by a natural user interface of the near-eye, mixed reality display device system indicating user selection of a real reading object in the field of view as the reading object;
   responsive to determining the user input has been detected indicating user selection of a real reading object in the field of view, identifying a reading object type of the real reading object and selecting the real reading object as the reading object; and
   responsive to determining by the processor user input has not been detected by a natural user interface of the near-eye, mixed reality display device system indicating user selection of a real reading object, automatically identifying by the processor one or more reading object types associated with each of the requested one or more literary content items, selecting a reading object type from the one or more identified reading object types associated with each of the requested one or more literary content items based on stored layout rules, and selecting a virtual reading object having the selected reading object type as the reading object;
   automatically selecting by the processor of the near eye, mixed reality display device system print layout characteristics for each of the one or more literary content items based on the reading object type of the reading object; and
   displaying in the near-eye display of the near-eye, mixed reality display device system the one or more literary content items with their respective print layout characteristics for having the appearance of printed content registered to the reading object in the field of view.

2. The method of claim 1 wherein the reading object comprises at least one of the following from the group consisting of:
   one or more pages of real paper;
   a real book;
   a real newspaper;
   a real magazines; one or more pages of virtual paper;
   a virtual book;
   a virtual newspaper; and
   a virtual magazine.

3. The method of claim 1 wherein automatically selecting by the processor of the near eye, mixed reality display device system print layout characteristics for each of the one or more literary content items based on the reading object type of the reading object further comprises:
   identifying by the processor a medium independent work identifier and any applicable medium independent work version identifier for each literary content item;
   determining by the processor for each literary content item whether one or more publisher rule sets of print layout characteristics for the reading object type of the reading object are available; and
   responsive to one or more publisher rule sets of print layout characteristics for the reading object type of the reading object not being available for the respective literary content item, assigning by the processor print layout characteristics for the reading object type of the reading object for the respective literary content item.

4. The method of claim 3 further comprising:
   responsive to a plurality of publisher rule sets of print layout characteristics for the reading object type of the reading object being available for the respective literary content item, selecting by the processor at least one of the available one or more respective publisher print layout characteristics rule sets over a network from one or more datastores storing publisher print layout characteristics rule sets based on page size dimensions of the reading object, visibility criteria and any user layout preferences.

5. The method of claim 1 wherein displaying in the near-eye display of the near-eye, mixed reality display device system the one or more literary content items with their respective print layout characteristics for having the appearance of printed content registered to the reading object in the field of view further comprises:
   generating by the processor one or more page layouts including the one or more literary content items with respective print layout characteristics for the reading object type of the reading object in accordance with stored layout rules;
   displaying by the display of the near-eye, mixed reality display system one or more pages based on the one or more page layouts in the field of view of the mixed reality display device system; and
   changing by the processor the one or more pages displayed responsive to user physical action manipulating the one or more pages detected by the natural user interface.

6. The method of claim 5 wherein generating by the processor one or more page layouts including the one or more literary content items with respective print layout characteristics for the reading object type of the reading object in accordance with stored layout rules further comprises:
   assigning the one or more literary content items to one or more sets of literary content items based on a reading object type associated with each of the one or more literary content item, each set grouping one or more literary content items associated with a same or compatible reading object type;
   determining an item order of display of the one or more literary content items based on user preferences;
   determining a set order of display of the one or more sets based on a priority indicated in the determined item order; and
   generating a page layout set of one or more page layouts for each set of literary content items.

7. The method of claim 6 wherein generating a page layout set of one or more page layouts for each set of literary content items further comprises:

determining by the processor an intra-set order of display of the one or more literary content items within the set based on user preferences;

selecting by the processor a block template for each page based on the reading object type for the set and the print layout characteristics of the items in the set;

assigning each literary content item in the set to a starting page number within the set based on priority in the intra-set order, size characteristics of the respective item and page dimensions for the reading object;

for each page layout, assigning each item assigned to the page layout to a block on the page layout based on the size characteristics of the respective literary content item; and responsive to any of the blocks not satisfying visibility criteria, performing adjustment of one or more adjustable print layout characteristics of the literary content items for satisfying visibility criteria.

8. The method of claim 1 wherein the selecting a reading object type from the one or more identified reading object types associated with each of the requested one or more literary content items based on stored layout rules further comprises the stored layout rules include a layout rule selecting as the reading object type a reading object type associated with a highest percentage of literary content in the one or more requested literary content items.

9. The method of claim 1 further comprising determining an item order of display of the literary content items based on user preferences.

10. A near-eye, mixed reality display device system for displaying virtual data as printed content comprising:

a near-eye display positioned by a support structure of the near-eye, mixed reality display device system;

at least one outward facing camera positioned on the support structure for capturing image data of a field of view of the near-eye display;

one or more software controlled processors communicatively coupled to the at least one outward facing camera for receiving the image data of the field of view;

the one or more software controlled processors being operable for implementing a natural user interface based on the image data of the field of view;

the one or more software controlled processors being operable for identifying a user request via the natural user interface to display one or more literary content items having the appearance of printed content on at least one reading object in the field of view of the near-eye display;

the one or more software controlled processors having access to one or more datastores storing literary content items and associated print layout characteristics for the stored literary content items, the one or more databases associating one or more reading object types with each of the literary content items and for their associated print layout characteristics;

the one or more software controlled processors being operable for selecting the at least one reading object upon which to display the requested one or more literary content items by responsive to the one or more software controlled processors determining the user request indicates user selection of a real reading object in the field of view, the one or more software controlled processors identifying a reading object type of the real reading object and selecting the real reading object as the reading object, responsive to the one or more software controlled processors determining the user request does not indicate user selection of a real reading object, the one or more software controlled processors selecting at least one virtual reading object as the reading object by the one or more software controlled processors automatically identifying one or more reading object types associated with each of the requested one or more literary content items in the one or more datastores, the one or more software controlled processors selecting at least one reading object type from the one or more identified reading object types associated with each of the requested one or more literary content items based on stored layout rules, and the one or more software controlled processors selecting at least one virtual reading object having the at least one selected reading object type as the reading object;

the one or more software controlled processors being operable for automatically selecting print layout characteristics for each of the one or more literary content items based on the at least one reading object type of the at least one reading object; and the one or more software controlled processors causing at least one communicatively coupled image generation unit, which is optically coupled to the near-eye display, to display the one or more literary content items with their respective selected print layout characteristics for having the appearance of printed content registered to the reading object in the field of view.

11. The system of claim 10 wherein the stored layout rules include a layout rule selecting as the reading object type a reading object type associated with a highest percentage of literary content in the one or more requested literary content items.

12. The system of claim 10 further comprising:

the one or more software controlled processors being operable for generating one or more page layouts including the one or more literary content items with respective print layout characteristics for the reading object type of the reading object in accordance with stored layout rules further comprising the one or more software controlled processors being operable for assigning the one or more literary content items to one or more sets of literary content items based on a reading object type associated with each of the one or more literary content item, each set grouping one or more literary content items associated with a same or compatible reading object type;

the one or more software controlled processors being operable for determining an item order of display of the one or more literary content items based on user preferences;

the one or more software controlled processors being operable for determining a set order of display of the one or more sets based on a priority indicated in the determined item order; and the one or more software controlled processors being operable for generating a page layout set of one or more page layouts each set of literary content items.

13. The system of claim 10 further comprising:

the one or more software controlled processors being operable for identifying via the natural user interface a user content selection within a literary content item of the one or more literary content items, the literary content item being displayed with a first layout based on the reading object type of the reading object;

the one or more software controlled processors forming a data link in one or more accessible datastores between user generated augmentation data for the user content selection and a stored medium independent version of the literary content item;

the one or more software controlled processors being operable for subsequently identifying via the natural user interface the user content selection within the literary content item being displayed with a second, different layout based on a different reading object type;

the one or more software controlled processors retrieving the user generated augmentation data from the one or more accessible datastores based on the data link; and the one or more software controlled processors being operable for displaying the retrieved augmentation data at a position registered to the user content selection of the literary content item in the second, different layout.

14. The system of claim 12 wherein the one or more software controlled processors being operable for generating a page layout set of one or more page layouts for each set of literary content items further comprises:

the one or more software controlled processors being operable for determining by the processor an intra-set order of display of the one or more literary content items within the set based on user preferences;

the one or more software controlled processors being operable for selecting by the processor a block template for each page based on the reading object type for the set and the print layout characteristics of the items in the set;

the one or more software controlled processors being operable for assigning each literary content item in the set to a starting page number within the set based on priority in the intra-set order, size characteristics of the respective item and page dimensions for the reading object;

the one or more software controlled processors being operable for each page layout, assigning each item assigned to the page layout to a block on the page layout based on the size characteristics of the respective literary content item; and the one or more software controlled processors being operable for responsive to any of the blocks not satisfying visibility criteria, performing adjustment of one or more adjustable print layout characteristics of the literary content items for satisfying visibility criteria.

15. One or more processor readable non-volatile storage devices having instructions encoded thereon for causing one or more processors to execute a method for displaying virtual data having an appearance of printed content using a near-eye, mixed reality display device system, the method comprising:

receiving a request by the near eye, mixed reality display device system to display one or more literary content items having the appearance of printed content on a reading object in a field of view of a near-eye display of the near-eye, mixed reality display device system;

determining by a processor of the near-eye, mixed reality display device system whether user input has been detected by a natural user interface of the near-eye, mixed reality display device system indicating user selection of a real reading object in the field of view as the reading object;

responsive to determining the user input has been detected indicating user selection of a real reading object in the field of view, identifying a reading object type of the real reading object and selecting the real reading object as the reading object; and responsive to determining by the processor user input has not been detected by a natural user interface of the near-eye, mixed reality display device system indicating user selection of a real reading object, automatically identifying by the processor one or more reading object types associated with each of the requested one or more literary content items, selecting a reading object type from the one or more identified reading object types associated with each of the requested one or more literary content items based on stored layout rules, and selecting a virtual reading object having the selected reading object type as the reading object;

automatically selecting by the processor of the near eye, mixed reality display device system print layout characteristics for each of the one or more literary content items based on the reading object type of the reading object; and displaying in the near-eye display of the near-eye, mixed reality display device system the one or more literary content items with their respective print layout characteristics for having the appearance of printed content registered to the reading object in the field of view.

16. The one or more processor readable non-volatile storage devices of claim 15 further comprising displaying virtual augmentation data registered to at least one of the one or more literary content items responsive to physical action user input including:

identifying a user content selection within a literary content item based on physical action user input;

determining whether augmentation data is available for the user content selection;

responsive to augmentation data being available for the user content selection, selecting the augmentation data from the available augmentation data based on user profile data; and displaying the augmentation data in a position registered to the position of the user content selection.

17. The one or more processor readable non-volatile storage devices of claim 15 wherein the method further comprises determining an item order of display of the literary content items based on user preferences.

18. The one or more processor readable non-volatile storage devices of claim 15 wherein displaying in the near-eye display of the near-eye, mixed reality display device system the one or more literary content items with their respective print layout characteristics registered to the reading object in the field of view further comprises:

generating by the processor one or more page layouts including the one or more literary content items with respective print layout characteristics for the reading object type of the reading object in accordance with stored layout rules;

displaying by the display of the near-eye, mixed reality display system one or more pages based on the one or more page layouts in the field of view of the mixed reality display device system; and changing by the processor the one or more pages displayed responsive to user physical action manipulating the one or more pages detected by the natural user interface.

19. The one or more processor readable non-volatile storage devices of claim 18 wherein generating by the processor one or more page layouts including the one or more literary content items with respective print layout characteristics for the reading object type of the reading object in accordance with stored layout rules further comprises:

assigning the one or more literary content items to one or more sets of literary content items based on a reading object type associated with each of the one or more literary content item, each set grouping one or more literary content items associated with a same or compatible reading object type;

determining an item order of display of the one or more literary content items based on user preferences;

determining a set order of display of the one or more sets based on a priority indicated in the determined item order; and generating a page layout set of one or more page layouts for each set of literary content items.

20. The one or more processor readable non-volatile storage devices of claim 19 wherein generating a page layout set of one or more page layouts for each set of literary content items further comprises:

determining by the processor an intra-set order of display of the one or more literary content items within the set based on user preferences;

selecting by the processor a block template for each page based on the reading object type for the set and the print layout characteristics of the items in the set;

assigning each literary content item in the set to a starting page number within the set based on priority in the intra-set order, size characteristics of the respective item and page dimensions for the reading object;

for each page layout, assigning each item assigned to the page layout to a block on the page layout based on the size characteristics of the respective literary content item; and responsive to any of the blocks not satisfying visibility criteria, performing adjustment of one or more adjustable print layout characteristics of the literary content items for satisfying visibility criteria.

* * * * *